(12) United States Patent
Baker et al.

(10) Patent No.: US 8,901,443 B2
(45) Date of Patent: Dec. 2, 2014

(54) MULTI-POSITION SWITCH ASSEMBLY FOR CONTROLLING A VEHICLE DISPLAY SCREEN

(75) Inventors: Alex W. Baker, Ostrander, OH (US); Takanori Terao, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 13/572,308

(22) Filed: Aug. 10, 2012

(65) Prior Publication Data

US 2014/0043303 A1  Feb. 13, 2014

(51) Int. Cl.
*H01H 9/00* (2006.01)
*H01H 19/62* (2006.01)
*H01H 27/00* (2006.01)

(52) U.S. Cl.
USPC ........................................................ 200/17 R

(58) Field of Classification Search
USPC ............... 200/4, 5 A, 6 A, 11, 11 R, 18, 17 R
See application file for complete search history.

(56) References Cited

U.S. PATENT DOCUMENTS

| | | | |
|---|---|---|---|
| 5,430,262 A | 7/1995 | Matsui et al. | |
| 5,510,810 A | 4/1996 | Nishijima et al. | |
| 5,621,196 A | 4/1997 | Nishijima et al. | |
| 5,847,335 A | 12/1998 | Sugahara et al. | |
| 5,952,628 A | 9/1999 | Sato et al. | |
| 6,080,941 A | 6/2000 | Yokobori | |
| 6,162,999 A | 12/2000 | Ishikawa et al. | |
| 6,396,006 B1 | 5/2002 | Yokoji et al. | |
| 7,091,430 B1 | 8/2006 | Haizima et al. | |
| 7,242,390 B2 | 7/2007 | Bader et al. | |
| 7,342,187 B2 | 3/2008 | Yamaguchi | |
| 7,390,985 B2 | 6/2008 | Onodera | |
| 7,436,398 B2 | 10/2008 | Yuasa et al. | |
| 7,462,787 B1 | 12/2008 | Kang et al. | |
| 7,507,919 B2 | 3/2009 | Sugahara et al. | |
| 8,198,555 B2 | 6/2012 | Baker | |
| 2004/0132498 A1 | 7/2004 | Clabunde et al. | |
| 2004/0189595 A1 | 9/2004 | Yuasa et al. | |
| 2004/0217938 A1 | 11/2004 | Abe et al. | |

(Continued)

FOREIGN PATENT DOCUMENTS

| | | |
|---|---|---|
| JP | 08212877 | 8/1996 |
| JP | 10050178 | 2/1998 |

OTHER PUBLICATIONS

International Search Report and Written Opinion dated Dec. 17, 2013, 12 pages.

*Primary Examiner* — Edwin A. Leon
*Assistant Examiner* — Anthony R. Jimenez
(74) *Attorney, Agent, or Firm* — Rankin, Hill & Clark LLP

(57) ABSTRACT

A multi-position switch assembly includes a housing, a first holder configured for both rotational and pivotal movement, and a second holder received in the first holder. In a pivoted position, first engagement members of the housing engage second engagement members of the first holder to prevent rotation of the first holder. The second holder is rotationally fixed and is pivotable with the first holder. The second holder supports the first holder but is not directly connected to the first holder. A pushbutton extends through the second holder, is fixed against rotation and is movable linearly relative to the second holder. A detector is adapted to detect rotation of the first holder. A first input device is actuated by pivotal movement of the second holder. The first holder is spaced from and does not contact the first input device. A second input device is actuated by linear movement of the pushbutton.

20 Claims, 18 Drawing Sheets

(56) References Cited

U.S. PATENT DOCUMENTS

| | | |
|---|---|---|
| 2004/0233159 A1 | 11/2004 | Badarneh |
| 2005/0161314 A1 | 7/2005 | Kameda |
| 2006/0191779 A1 | 8/2006 | Rochon et al. |
| 2006/0243568 A1 | 11/2006 | Badarneh |
| 2007/0159452 A1 | 7/2007 | Basche |
| 2009/0127078 A1 | 5/2009 | Hostmann et al. |
| 2010/0270133 A1 | 10/2010 | Baker |

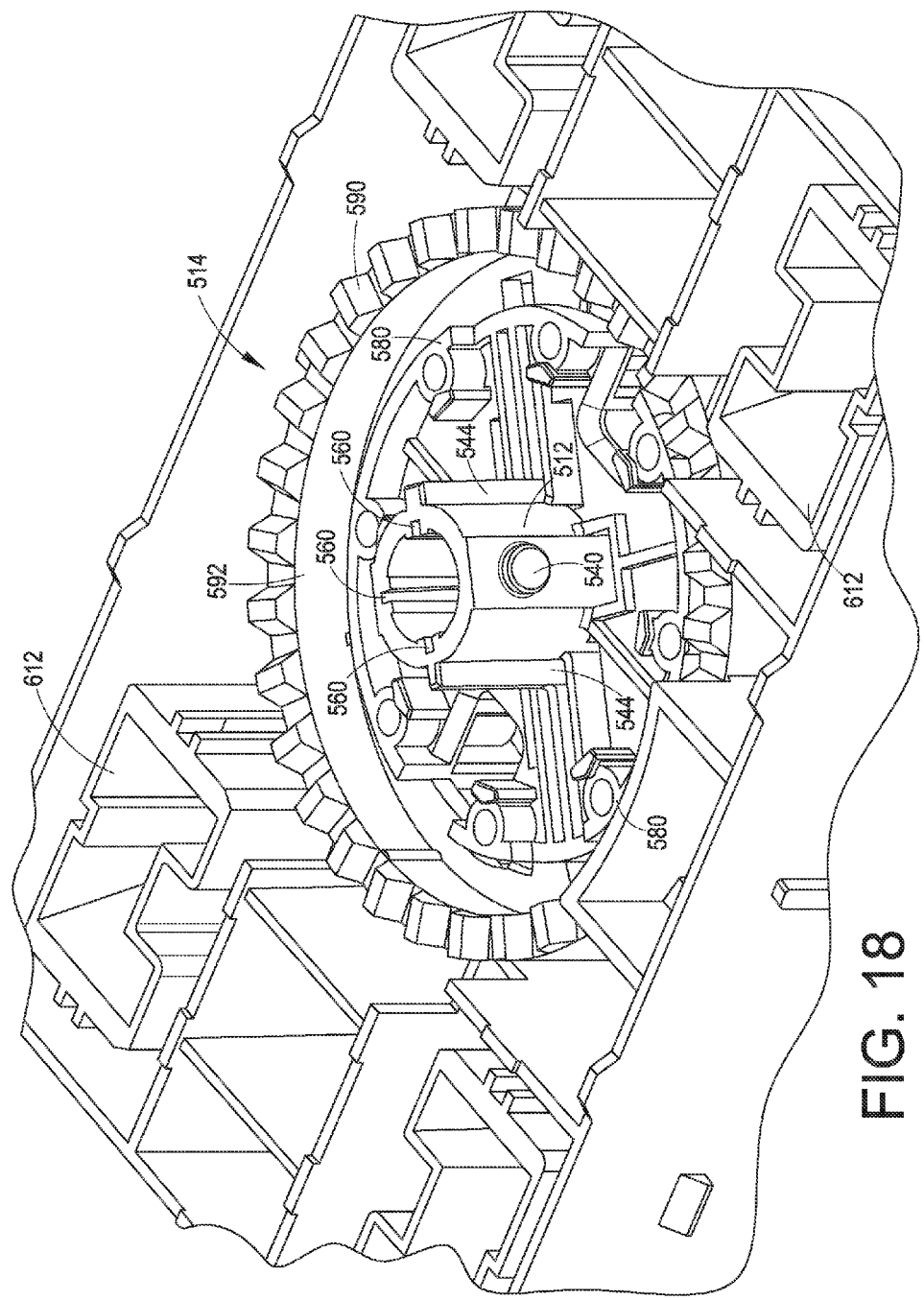

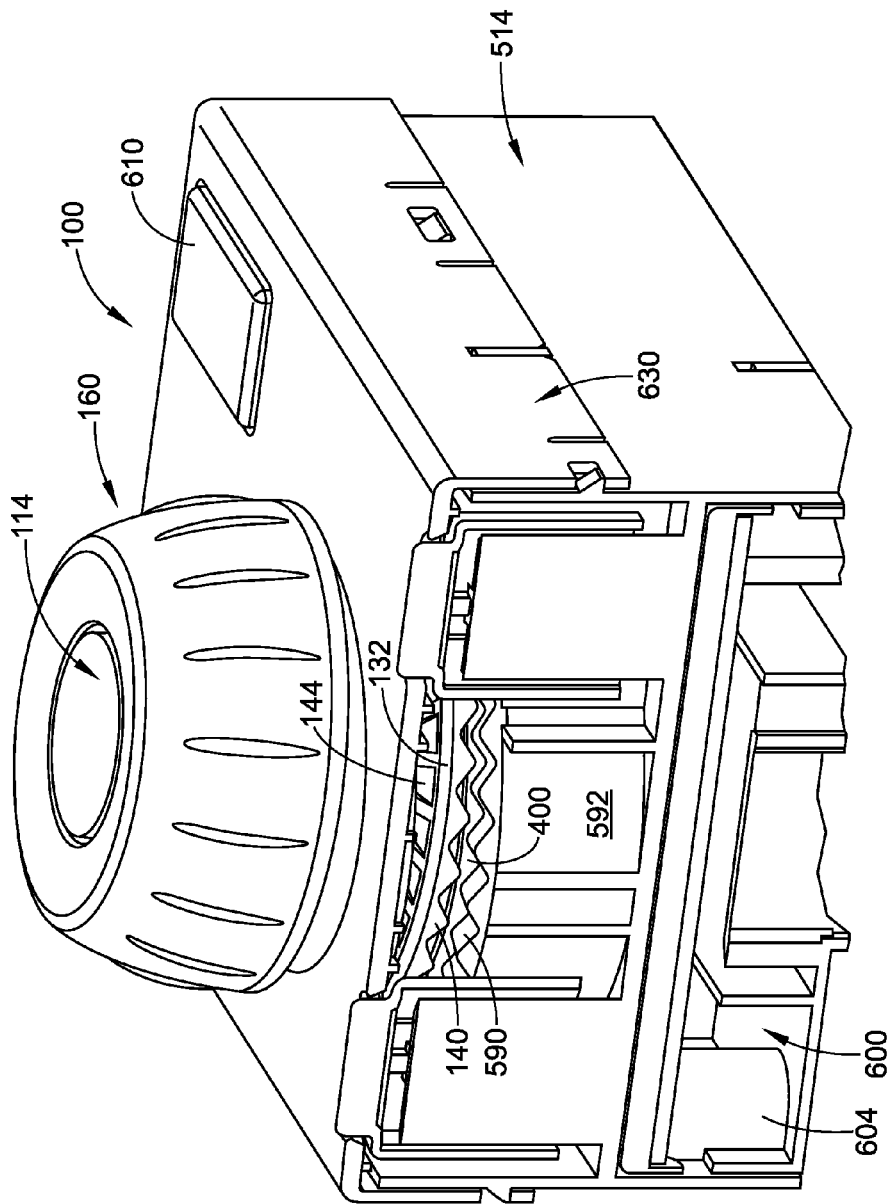

MULTI-POSITION SWITCH ASSEMBLY FOR CONTROLLING A VEHICLE DISPLAY SCREEN

BACKGROUND

Exemplary embodiments herein relate to a multi-position switch for controlling an image on a display screen of a display system, such as a display system mounted on a vehicle.

Some vehicle display systems simply employ touch screens; however, interacting with a touch screen can cause a driver to take his or her eyes off the road for too long. To improve safety, the display can be provided with an operating member or multi-position switch configured to move a cursor on the display screen and make a selection among a plurality of processing items or menus displayed on the display screen. Some such operating members are displaceable in an axial direction and rotatable around the axial direction. Selection is made among the various processing items on the display screen in accordance with an inputting operation by the operating member. With this known operating member, the slidable action and the rotatable action are effected through a one-piece member. Unfortunately, this can result in an inadvertent input or entry. For example, if only one of the slide or rotation operations was intended by the operator, the intended operation can cause an additional unexpected operation, such as the other of rotating or sliding of the operating member, respectively. This poses an unfavorable problem from the viewpoint of operability. While employing an operating member or multi-position switch on the display can decrease look-down time and increase safety, the current designs are too complex and expensive.

BRIEF DESCRIPTION

In accordance with one aspect, a multi-position switch assembly for controlling a vehicle display screen comprises a housing, a first holder configured for both rotational and pivotal movement with respect to the housing, and a second holder at least partially received in the first holder. The second holder is rotationally fixed with respect to the housing and is pivotable with the first holder. The second holder at least partially supports the first holder but is not directly connected to the first holder. A pushbutton extends through and is supported by the second holder. The pushbutton is fixed against rotation with respect to the housing and is movable linearly relative to the second holder. A detector is adapted to detect rotation of the first holder. A first input device is actuated by pivotal movement of the second holder. The first holder is spaced from the first input device such that rotational and pivotal movement of the first holder does not contact the first input device. A second input device is actuated by linear movement of the pushbutton.

In accordance with another aspect, a multi-position switch assembly for controlling a vehicle display screen comprises a housing, a first knob holder positioned within the housing and configured to rotate and pivot with respect to the housing, and a second holder positioned within the housing and at least partially received in the first knob holder. In a pivoted position, the first knob holder is configured to engage the housing to prevent rotation of the first knob holder while in the pivoted position. The second holder is fixed with respect to rotation of the first holder and is pivotable with the first holder. The second holder at least partially supports the first holder within the housing. A pushbutton extends through the first holder and the second holder. The pushbutton is supported by the second holder. The pushbutton is fixed against rotation with respect to the housing and is movable linearly relative to the second holder. A detector is adapted to detect rotation of the first holder. A plurality of first momentary-contact switches is positioned within the housing, each first momentary-contact switch being actuated by pivoting movement of the second holder. A second momentary-contact switch is positioned within the housing and actuated by linear movement of the pushbutton.

In accordance with yet another aspect, a multi-position switch assembly for controlling a vehicle display screen comprises a housing including a wall having a plurality of first engagement members. A first knob holder is positioned within the housing and is configured to rotate and pivot with respect to the housing. The first knob holder has a plurality of second engagement members. In a pivoted position, the first engagement members engage the second engagement members to prevent rotation of the knob holder while in the pivoted position. A second holder is positioned within the housing and at least partially received in the first holder. The second holder is fixed with respect to rotation of the first holder and is pivotable with the first holder. The second holder at least partially supports the first holder within the housing but is not directly connected to the first holder. A joint member is operably connected to both the housing and the second holder. The connection of the joint member defines separate pivotal axes which allow for the pivoting movement of the first and second holders. A pushbutton extends through the first holder and the second holder. The pushbutton is fixed against rotation with respect to the housing and is movable linearly relative to the second holder. A detector is adapted to detect rotation of the first holder. A plurality of first momentary-contact switches is positioned within the housing, each first momentary-contact switch being actuated by pivoting movement of the second holder. The first holder is spaced from the first momentary-contact switches as the first holder rotates within the housing. A second momentary-contact switch is positioned within the housing and actuated by linear movement of the pushbutton.

In accordance with still yet another aspect, a method of assembling the multi-function switch assembly for controlling a vehicle display screen is provided. The method comprises providing a housing including a plurality of engagement members; positioning a first knob holder within the housing so that the first holder rotates and pivots with respect to the housing, the first knob holder having a plurality of engagement members; aligning the engagement members such that in a pivoted position of the first holder the engagement members engage each other to prevent rotation of the first holder while in the pivoted position; positioning a second holder within the housing and at least partially in the first holder so that the second holder is pivotable with the first holder and is fixed with respect to rotation of the first holder; supporting the first holder in the housing with the second holder; connecting a joint member to both the housing and the second holder to define at least two pivotal axes which allow for pivoting movement of the first and second holders; positioning a pushbutton through the first holder and the second holder such that the pushbutton is fixed against rotation with respect to the housing and is movable linearly relative to the second holder; locating a detector within the housing to detect rotation of the first holder; locating a plurality of first momentary-contact switches within the housing such that each first momentary-contact switch is actuated by pivoting movement of the second holder; and locating a second momentary-contact switch within the housing such that the second momentary-contact switch is actuated by linear movement of the pushbutton.

BRIEF DESCRIPTION OF THE DRAWINGS

FIG. 18 is a perspective view of the lower housing portion of FIG. 16.

FIG. 19 is a perspective view, partially broken away, of the multi-position switch assembly of FIG. 1 in the pivoted position illustrating yet another aspect of the first holder and the lower housing portion.

DETAILED DESCRIPTION

Figure 1:
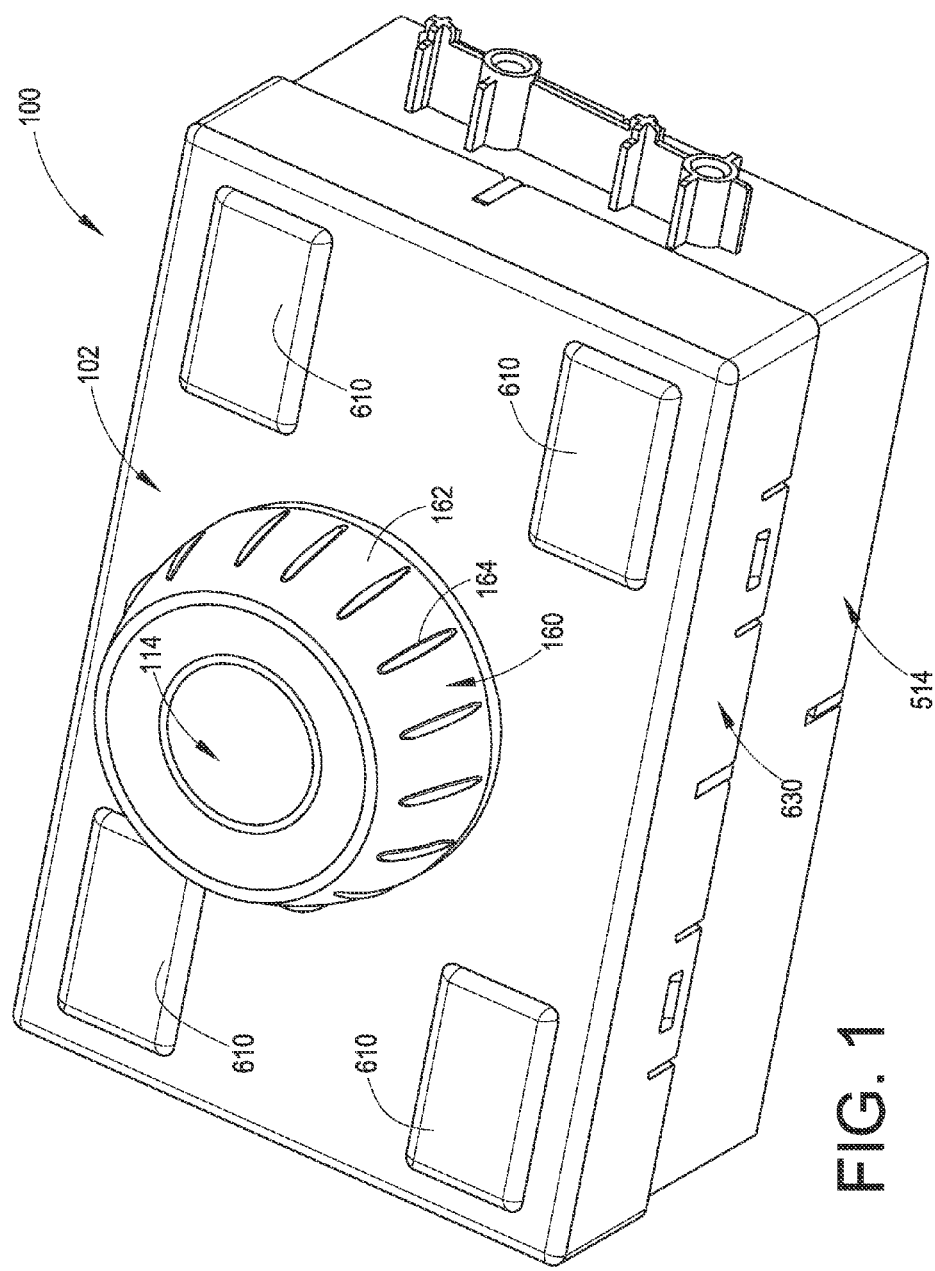
FIG. 1 is a perspective view of a multi-position switch assembly for controlling a vehicle display screen according to the present disclosure.

It should, of course, be understood that the description and drawings herein are merely illustrative and that various modifications and changes can be made in the structures disclosed without departing from the present disclosure. It will also be appreciated that the various identified components of the exemplary multi-position switch assembly for controlling an image on a vehicle display screen disclosed herein are merely terms of art that may vary from one manufacturer to another and should not be deemed to limit the present disclosure. All references to direction and position, unless otherwise indicated, refer to the orientation of the exemplary multi-position switch assembly illustrated in the drawings and should not be construed as limiting the claims appended hereto. Like numerals refer to like parts throughout the several views.

Figure 2:
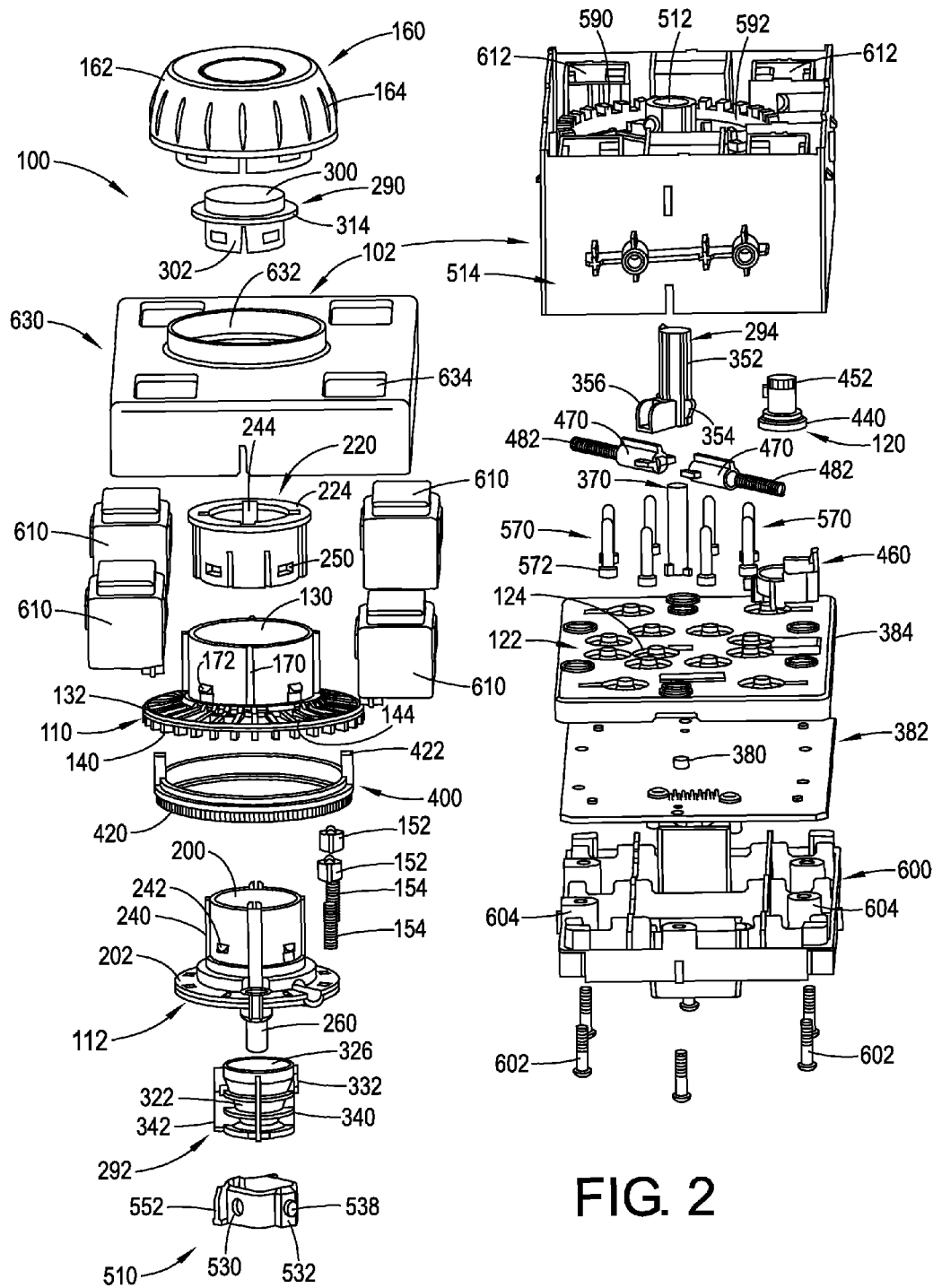
FIG. 2 is an exploded perspective view of the multi-position switch assembly of FIG. 1.
Figure 6:
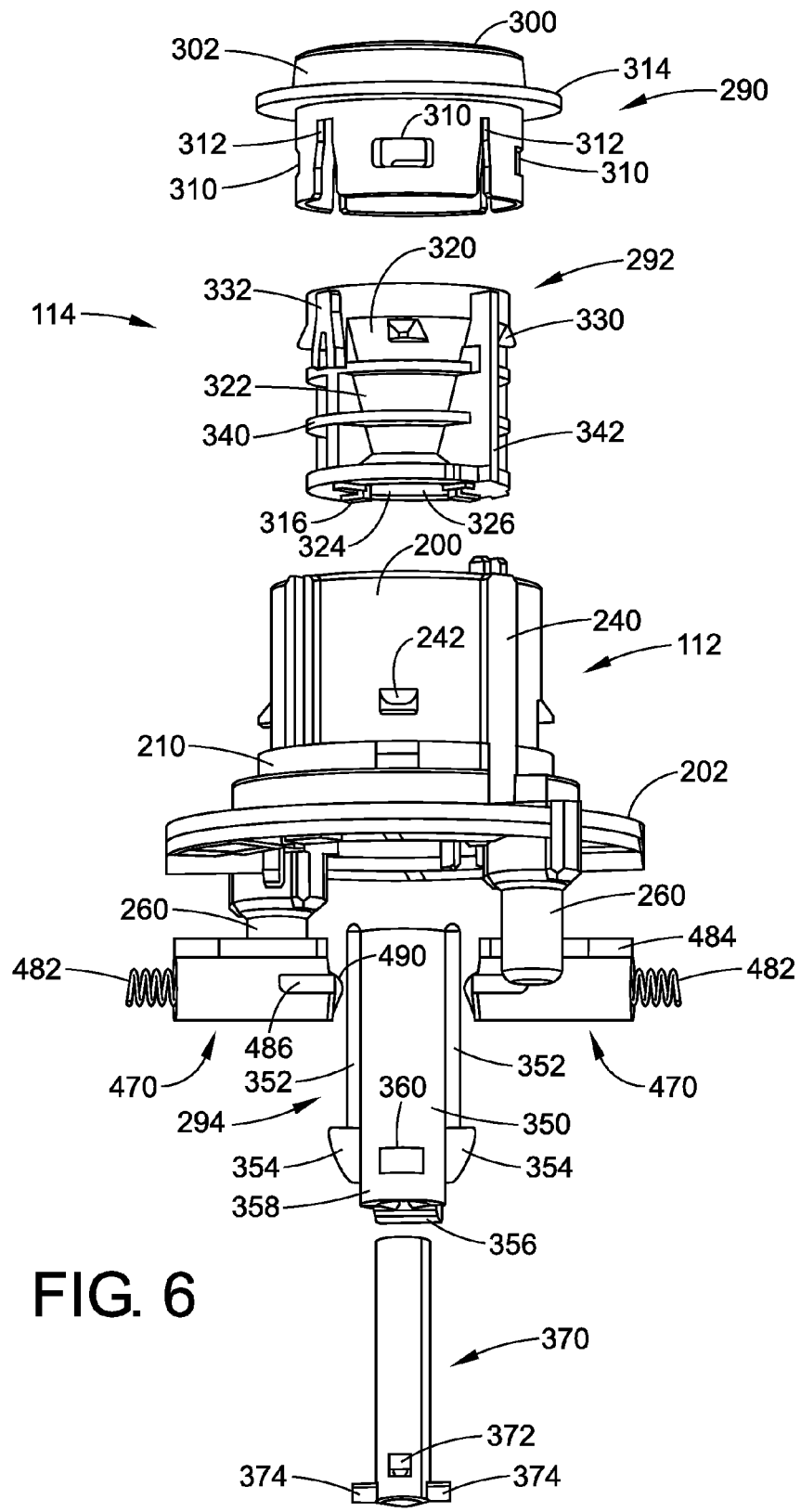
FIG. 6 is an exploded perspective view of a pushbutton, the second holder a second pin and a light guide of the multi-position switch assembly of FIG. 2.

Referring now to the drawings wherein the showings are for the purposes of illustrating one or more embodiments of the present disclosure, FIGS. 1 and 2 depict an exemplary multi-position switch assembly 100 for controlling a display screen (not shown) mounted on a vehicle. As will be described in greater detail below, the multi-position switch assembly 100 generally comprises a housing 102, a first knob holder 110 and a second holder 112 positioned within the housing, and a pushbutton 114 (FIG. 6). The first holder 110 is configured for both rotational and pivotal movement with respect to the housing 102. The second holder 112 is at least partially received in the first holder 110 and is fixed with respect to rotation of the first holder 110 and is pivotable with the first holder. The pushbutton 114 is fixed against rotation with respect to the housing 102 and is movable linearly relative to the second holder 112. A detector 120 is provided in the housing 102 and is adapted to detect rotation of the first holder 110. A first input device 122 is actuated by pivotal movement of the second holder 112. A second input device 124 is actuated by linear movement of the pushbutton 114

Figure 3:
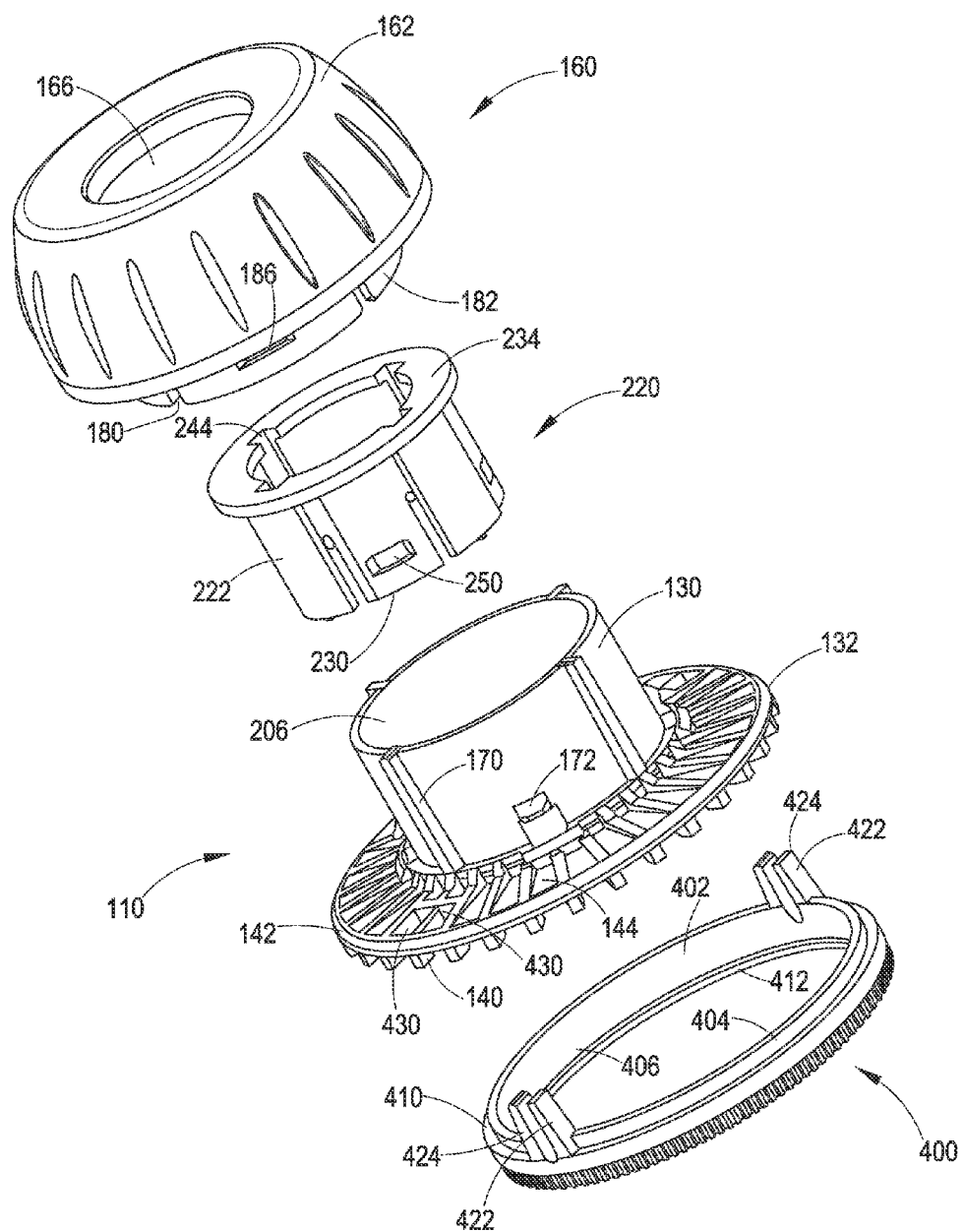
FIG. 3 is an exploded perspective view of a gripping member, a ring member, a first holder and a wheel of the multi-position switch assembly of FIG. 2.
Figure 4:
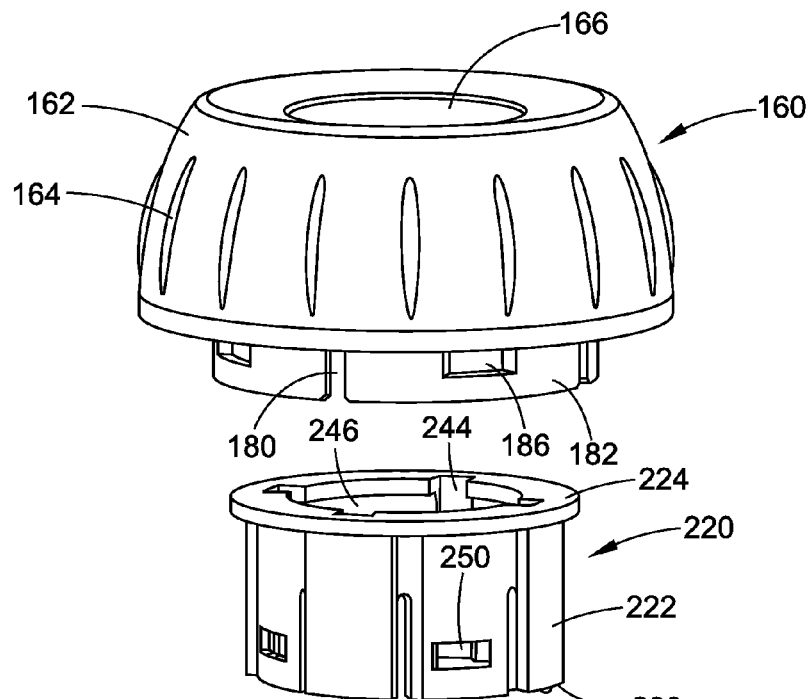
FIG. 4 is an exploded perspective view of the gripping member, the ring member, the first holder, a second holder and a first pin of the multi-position switch assembly of FIG. 2.
Figure 4:
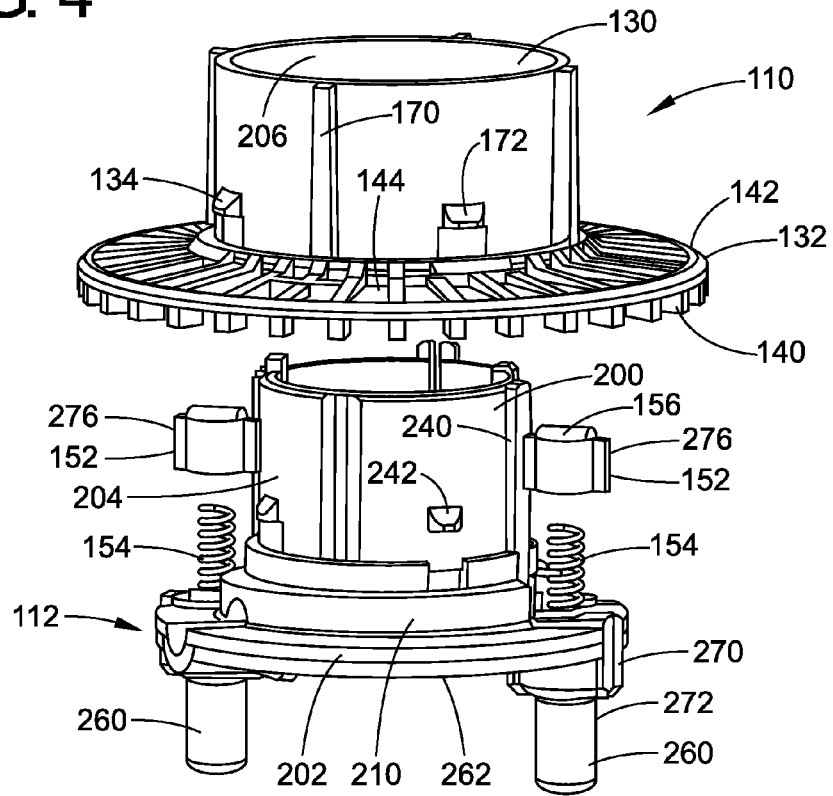
Figure 13:
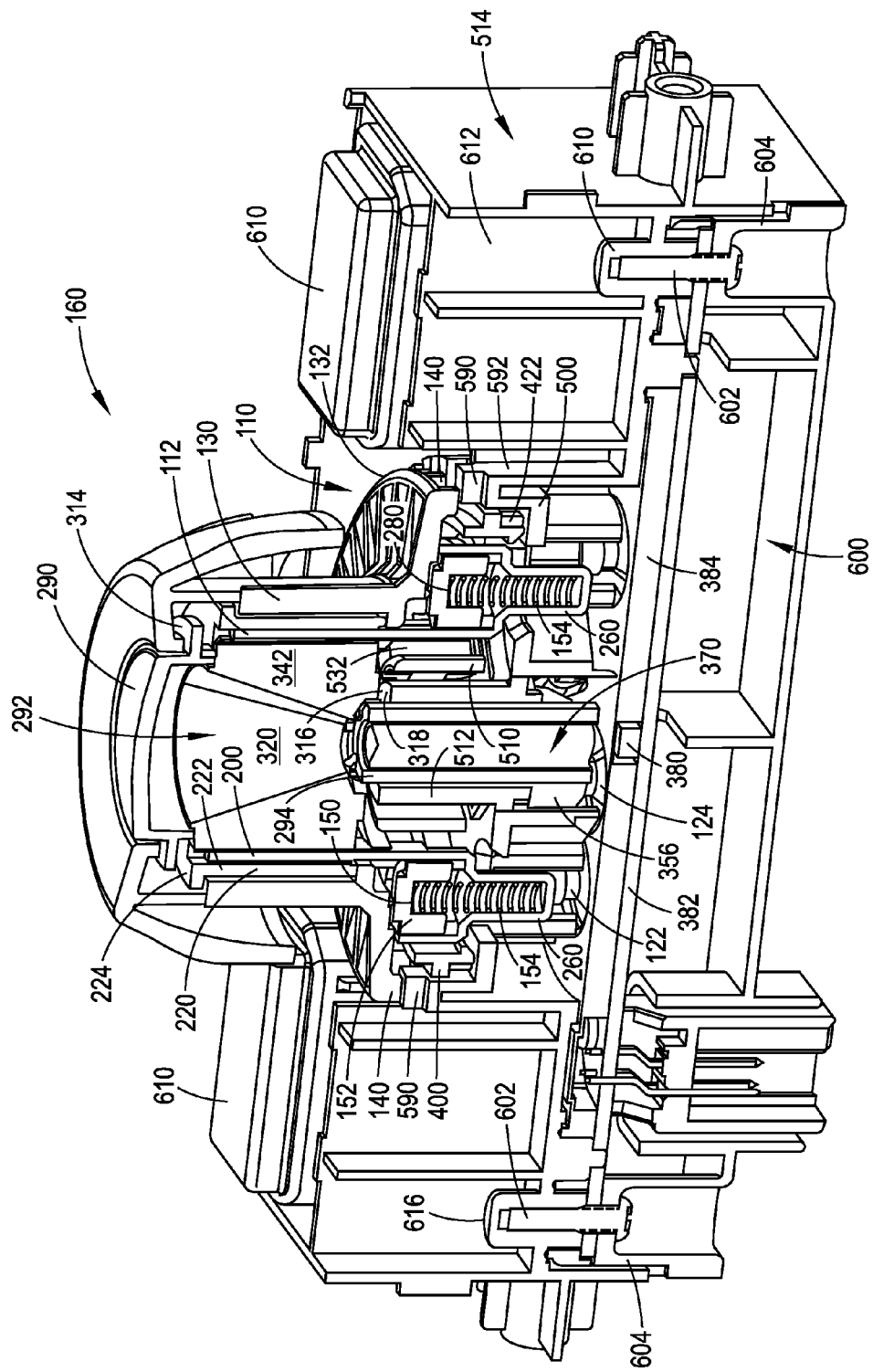
Figure 15:
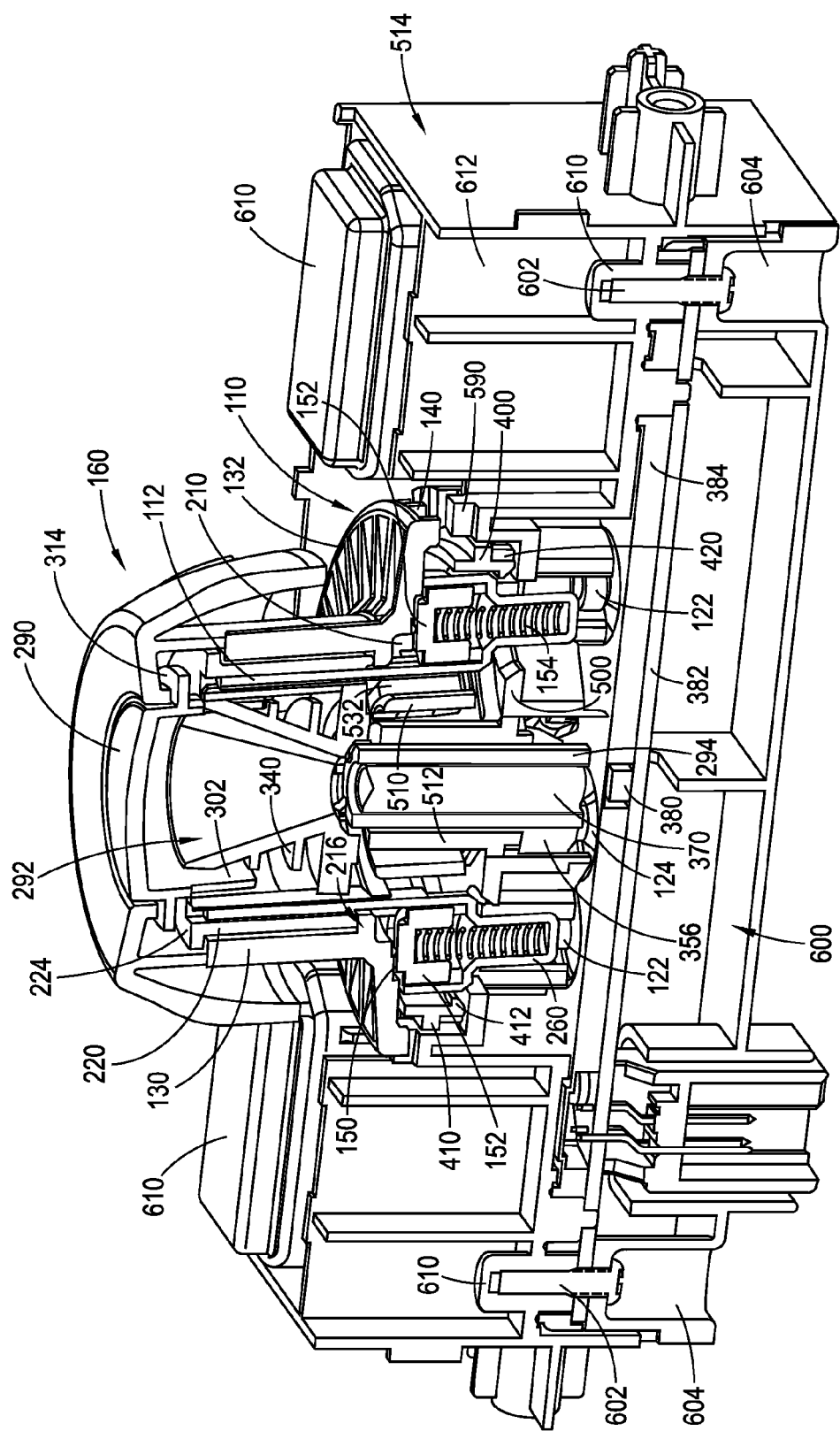
Figure 16:
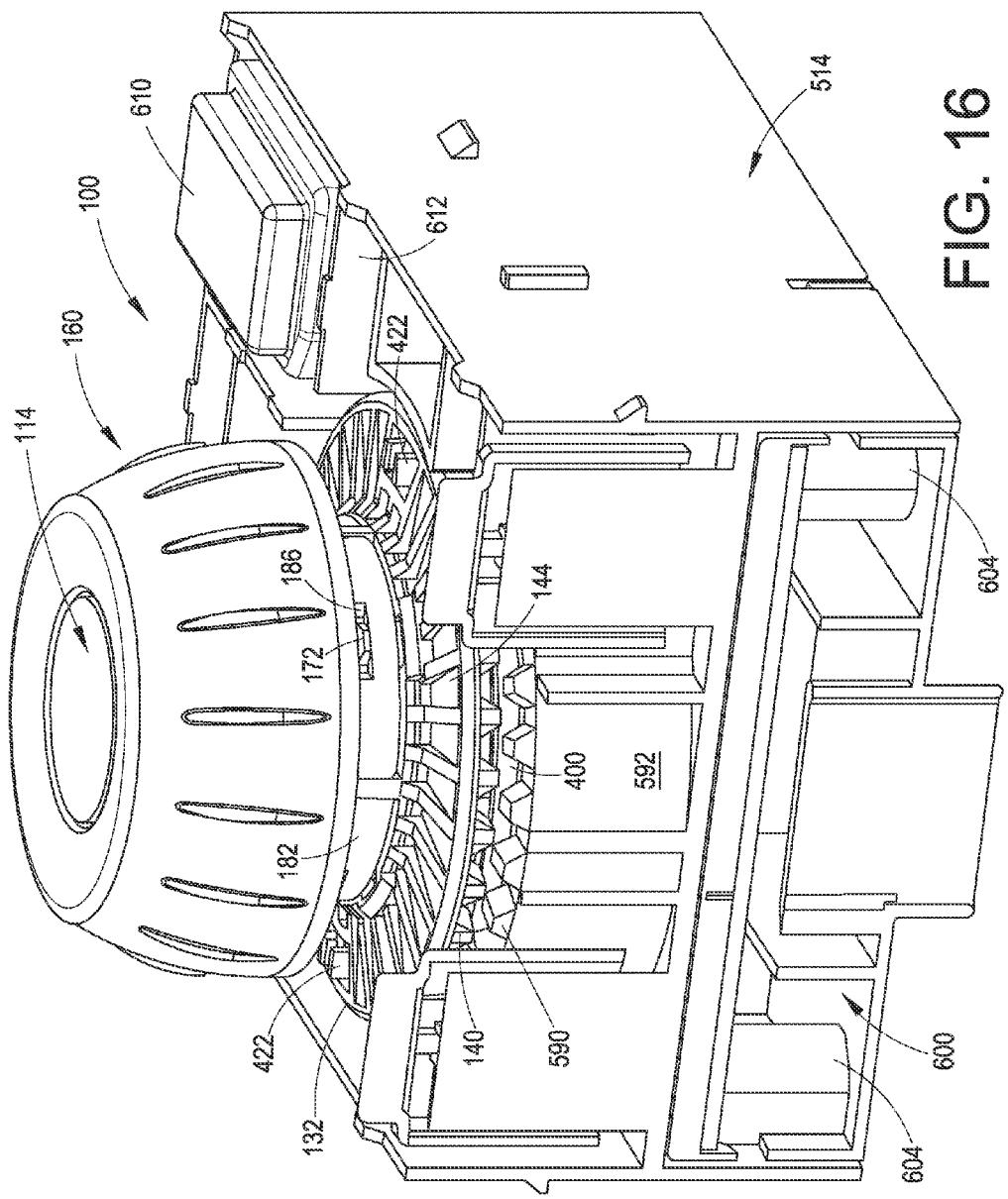
FIG. 16 is a perspective view, partially broken away, of the multi-position switch assembly of FIG. 1 illustrating another aspect of the first holder and the lower housing portion.
Figure 17:
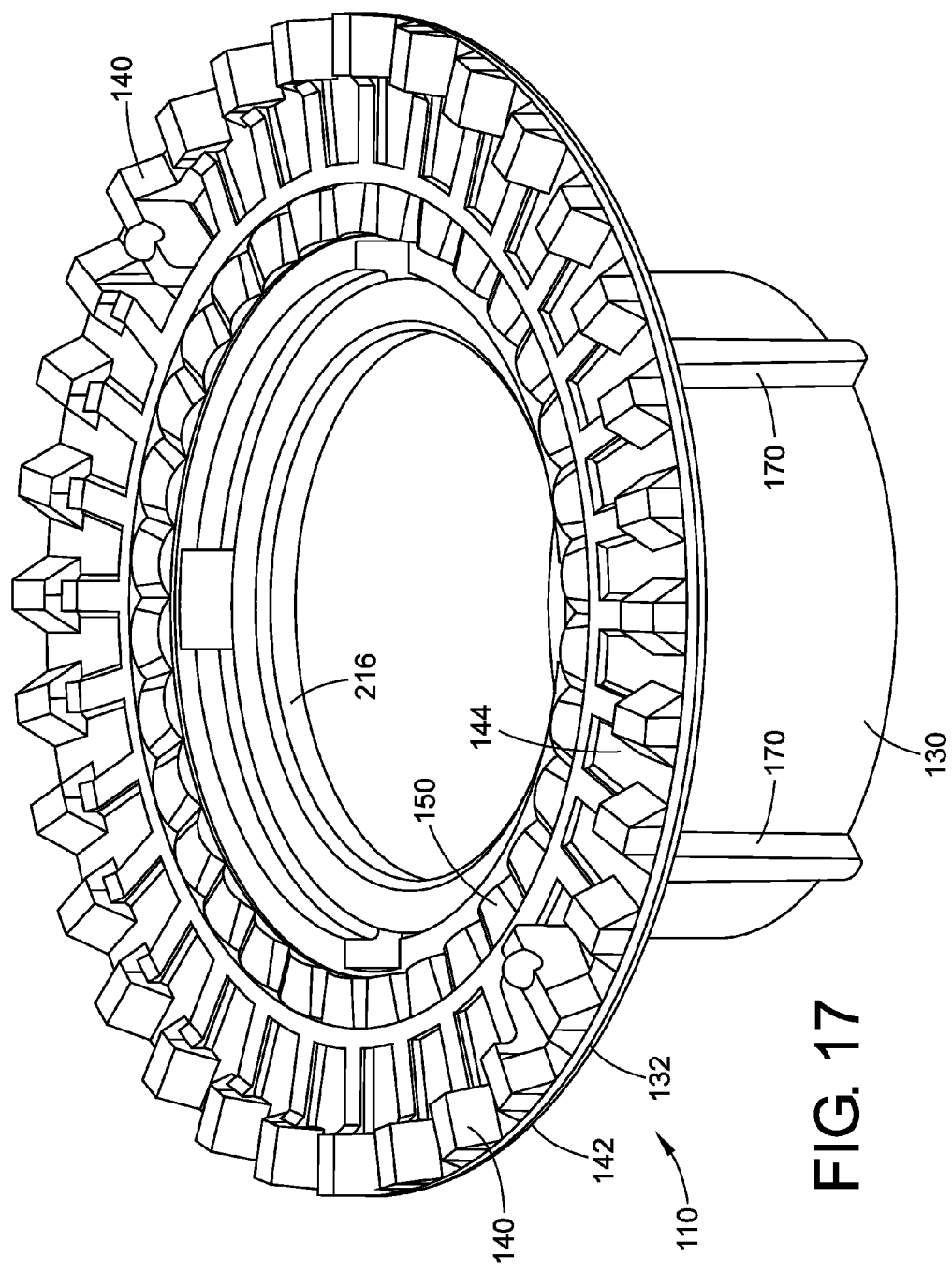
FIG. 17 is a bottom perspective view of the first holder of FIG. 16.

As shown in FIGS. 2-4, the first holder 110 includes a generally cylindrical part 130 and a flange 132. The flange 132 extends radially from a lower end portion 134 of the cylindrical part, and in the depicted embodiment, extends circumferentially around the end portion 134. A plurality of spaced apart engagement members or projections 140 are provided on the first holder 110. As illustrated, the projections 140 can be rectangular shaped, extend downwardly from the flange 132 and are located near a peripheral edge 142 of the flange 132. Openings 144 are provided between adjacent projections 140. Spaced inwardly from the projections 140 on the flange 132 are a plurality of indicators or bumps 150 (best illustrated in FIG. 17). As depicted in FIGS. 13 and 15, the indicators 150 are engaged by at least one first pin 152 provided on the second holder 112 as the first holder 110 is rotated thereby providing tactile feedback to the operator of the switch assembly 100 of rotation of the first holder 110. In the depicted embodiment, the second holder 112 includes a pair of spaced apart first pins 152. Each first pin 152 is biased (upwardly) toward the flange 132 of the first holder via a biasing member such as the illustrated spring 154. A top surface 156 of each pin 152 can be shaped similar to the shapes of the indicators 150 thereby allowing the pins 152 to smoothly ride over the indicators 150 as the first holder 110 rotates with respect to the housing 102 and second holder 112.

Figure 14:
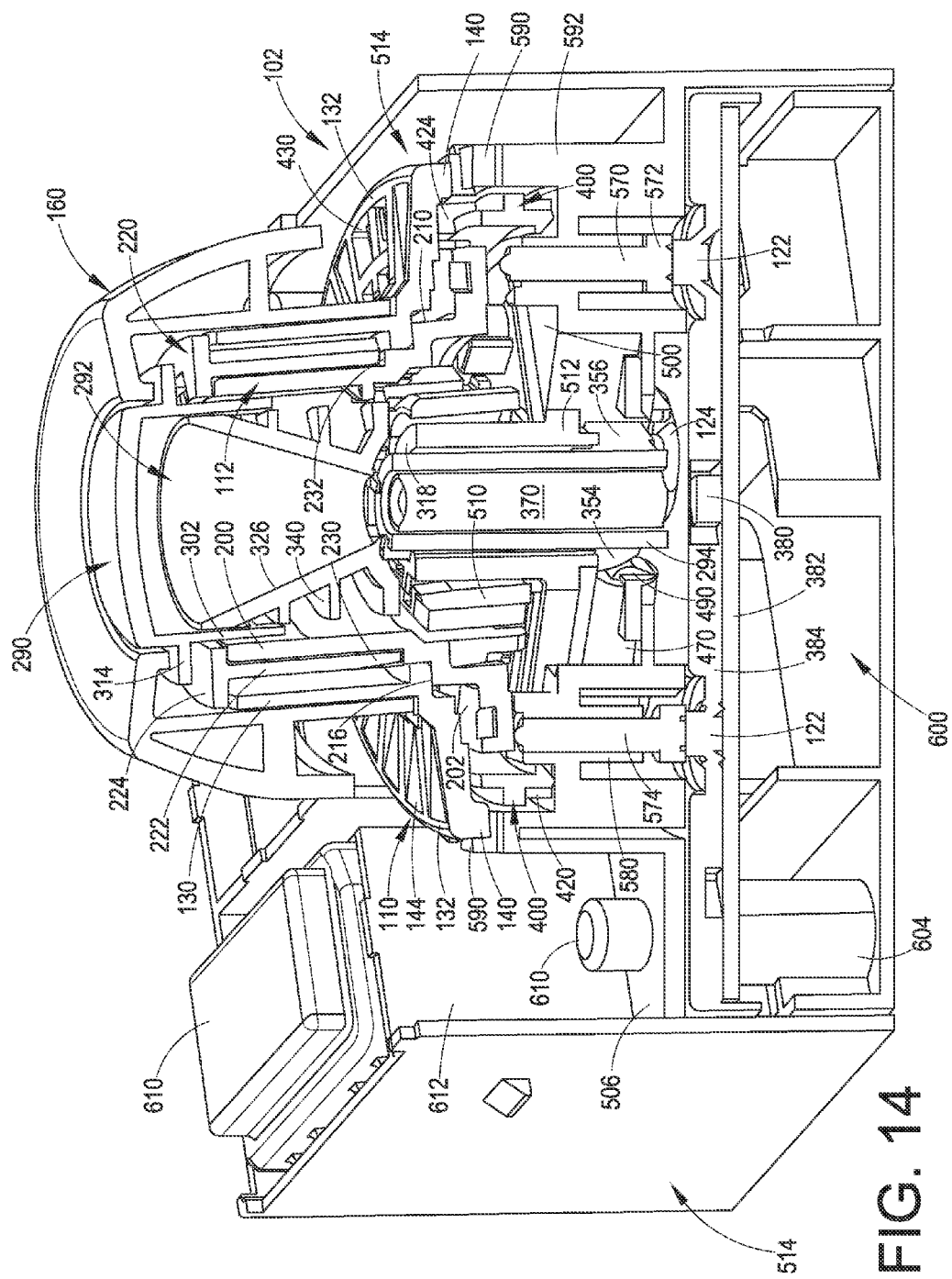
FIGS. 14 and 15 are perspective views, partially broken away, of the multi-position switch assembly of FIG. 1 in a tilted or pivoted condition.

An annular gripping member 160 is attached to the generally cylindrical part 130 of the first holder 110. The gripping member substantially surrounds the cylindrical part 130 and includes an outer wall 162 having a plurality of spaced apart raised portions 164 for ease of handling of the switch assembly by the operator. The gripping member includes an opening 166 which extends through the gripping member in an axial direction and receives a portion of the pushbutton 114 (FIGS. 13-15). To attach the gripping member 160 to the first holder 110, the cylindrical part 130 includes spaced apart, elongated ribs 170, which extend axially, and spaced apart attachment members or tabs 172 located on the end portion of the cylindrical part 130 circumferentially spaced from the respective ribs 170. The ribs 170 are slidingly received in corresponding elongated grooves 180 provided in an inner wall 182 of the gripping member 160. The tabs 172 are received in corresponding opening 186 located in the wall 182. Once secured to the first holder 110, the gripping member can rotate and pivot with the first holder 110 within the housing 102.

Figure 5:
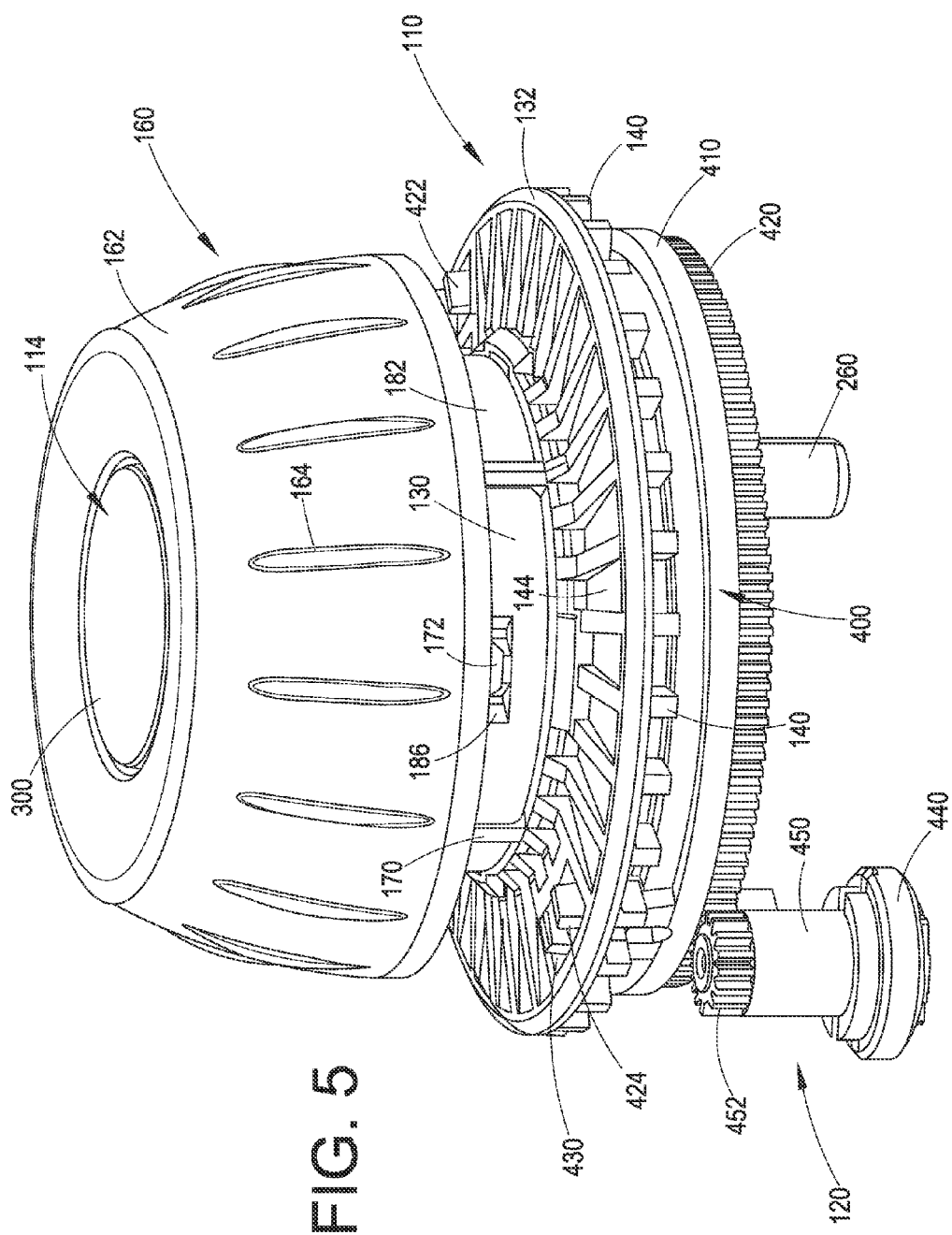
FIG. 5 is an assembled perspective view of the components of FIGS. 3 and 4 including a pushbutton and a detector of the multi-position switch assembly of FIG. 2.

As indicated previously, the second holder 112 is fixed with respect to rotation and is pivotable with the first holder 110. With this arrangement, and as depicted in FIGS. 4 and 5, the second holder 112 at least partially supports the first holder 110 but is not directly connected to the first holder. Particularly, the second holder 112 includes a generally cylindrical part 200 and a flange 202. The cylindrical part 200 is dimensioned smaller than the cylindrical part 130 of the first holder 110 such that when positioned at least partially within the cylindrical part 130, an outer surface 204 of the cylindrical part 200 is spaced from an inner surface 206 of the cylindrical part 130. An annular shelf 210 extends radially outwardly from a lower end portion 214 of the cylindrical part 200. On positioned in the first holder 110, the shelf 210 contacts a ledge 216 which extends radially inwardly from the end portion 134 of the cylindrical part 130 (FIG. 14). Similar to the first holder 110, the flange 202 extends radially from the end portion 214 of the cylindrical part 200, and in the depicted embodiment, extends circumferentially around the end portion 214. As will be described below, pivoting movement of the second holder 112 causes the flange 202 to actuate the first input device 122.

With reference to FIGS. 3 and 4, a ring member 220 is positioned between the inner surface 206 of the cylindrical part 130 and an outer surface 204 of the cylindrical part 200. The second holder 112 is at least partially received in the ring member 220 and is engaged thereto. Particularly, the ring member 220 includes a cylindrically shaped side wall 222 and an annular top wall 224. To attach the ring member to the second holder 112, the ring member 220 is positioned in the first holder 110 such that a lower end 230 of the side wall 222 rests on a ledge 232 (FIG. 7) of the cylindrical part 130. This positions the top wall 224 above an upper edge of the first holder 110. The cylindrical part 200 of the second holder 112 is then positioned in the ring member 220 (FIGS. 13-15). Particularly, and with reference again to FIG. 4, the cylindrical part 200 includes spaced apart, elongated ribs 240 and spaced apart attachment members or tabs 242. The ribs 240 are slidingly received in corresponding elongated grooves or channels 244 provided in an inner surface 246 of the side wall 222. The tabs 242 are received in corresponding opening 250 located in the side wall 222. Once engaged to the second holder 112, the ring member 220 is fixed relative to rotation and is pivotable with the second holder 112.

As indicated previously, the second holder 112 includes the pair first pins 152 biased toward the flange 132 of the first holder 110 for contacting the indicators 150 provided on the first holder during rotation of the first holder, which provides tactile feedback to the operator. To secure the first pins 152 and the corresponding springs 154 to the second holder 112, the flange 202 includes a pair of generally hollow bosses 260 which depend from a bottom surface 262 of the flange. As depicted in FIGS. 4, 10, 13 and 15, each boss 260 includes an upper portion 270 and a lower portion 272. The upper portion 270 of each boss 260 includes at least one groove 274 (FIG. 10) and each pin 152 includes at least one rib 276 configured to be slidingly received in the at least one groove 274. This allows displacement of the pin 152 in the boss 160 while maintaining the pin in the boss. As shown, each upper portion 170 includes a pair spaced grooves 274 and each pin includes a pair of spaced ribs 276. The lower portion 272 of each boss 260 receives one of the springs 154. To secure the springs 154 to the pins 152, each pin includes a cutout 280 on a bottom surface thereof, the cutout 280 being sized to securely receive an end portion of the spring 154.

Figure 7:
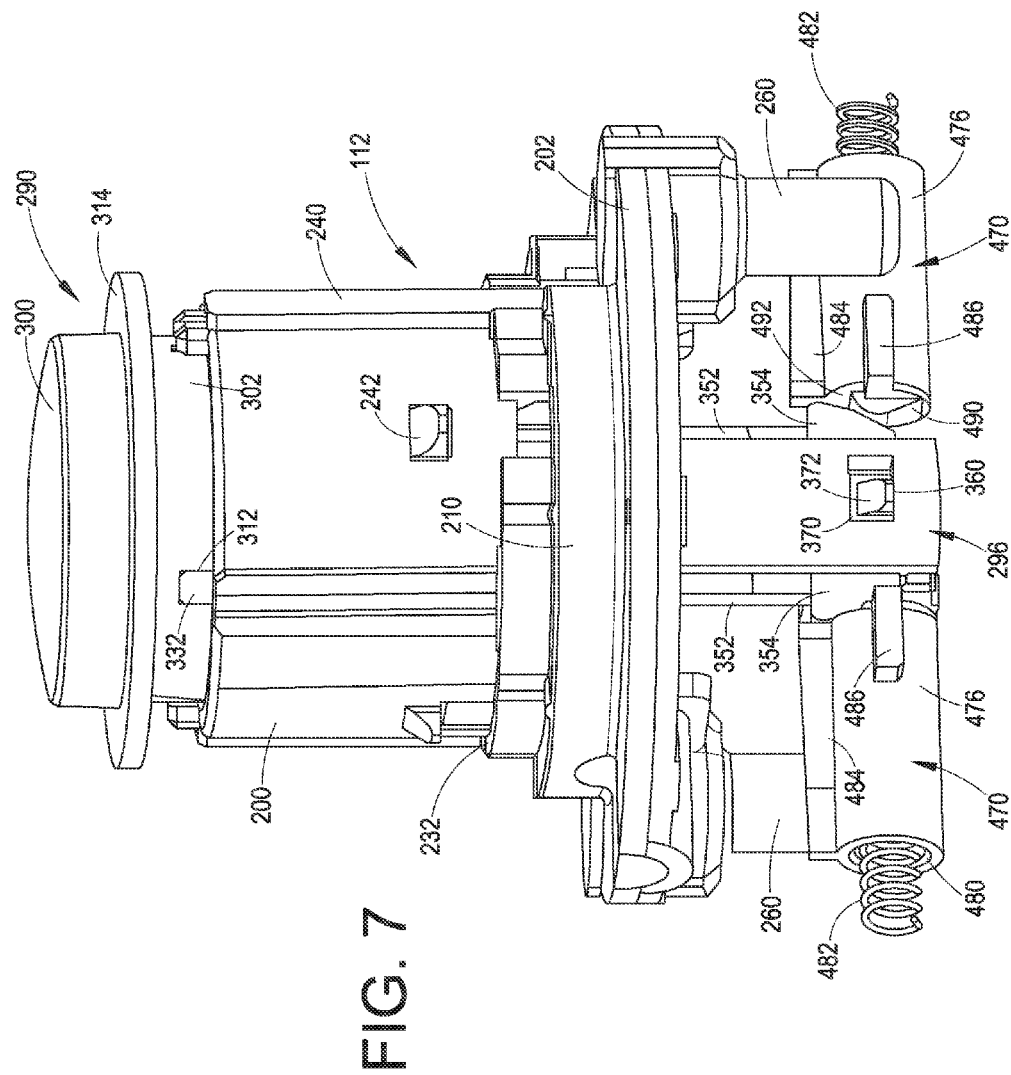
FIG. 7 is an assembled perspective view of the components of FIG. 6.
Figure 10:
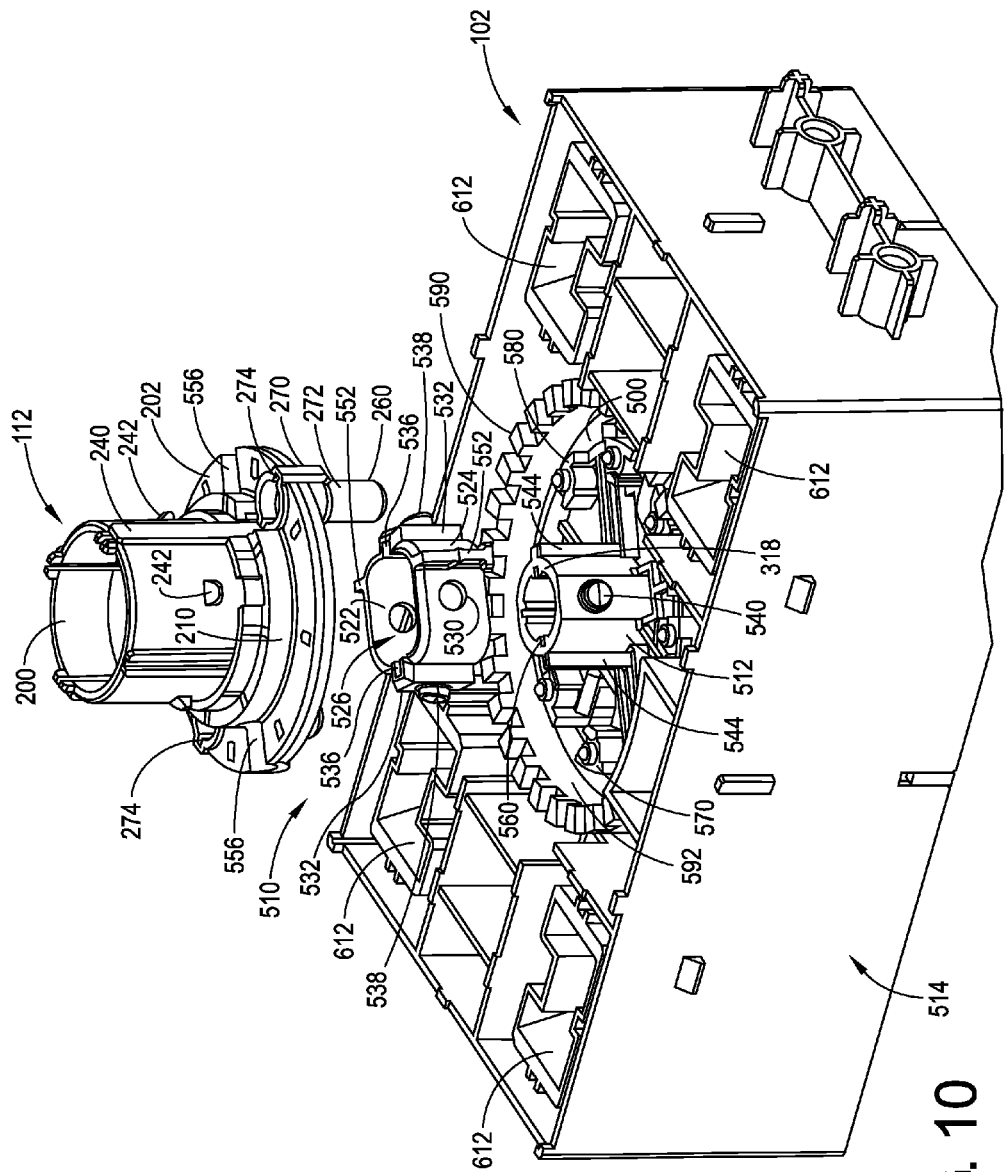
FIG. 10 is an exploded perspective view of the second holder, a joint member and a lower housing portion of the multi-position switch assembly of FIG. 2.

With reference to FIGS. 6 and 7, the pushbutton 114 extends through the first holder 110 and the second holder 112 and is supported by the second holder 112. The pushbutton 114 is fixed with respect to rotation of the first holder 110 and is movable linearly relative to the second holder 112 to selectively actuate the second input device 122. The pushbutton 114 generally includes an enter knob or button 290, a knob or button holder 292 and a slider 294. The enter button 290 includes a generally arcuate shaped top wall 300 and a cylin-drically shaped side wall 302. The side wall includes openings 310 and slots 312 having a generally wishbone shape; although, this is not required. A radially extending flange 314 is provided on the side wall 302 near the top wall 300. To limit the linear movement of the pushbutton 114, ribs 316 (FIG. 6) are provided on a lower portion of the button holder 292. Depression of the pushbutton 114 causes the ribs 316 to abut a top surface 318 of a stem 512 provided in a lower housing portion 514 (FIGS. 10 and 13).

The button holder 292 includes a generally conical shaped side wall 320 having an outer surface 322 and an inner surface 324. The inner surface defines a bore 326 which extends axially through the button holder 292. Provided on the side wall 320 are tabs 330 and axially aligned ribs 332, which have a shape corresponding to the shape of the slots 312. The button holder 292 further includes at least one first strengthening member 340 and at least one second strengthening member 342. The first strengthening member 340 extends substantially circumferentially about the outer surface 322. The second strengthening member 342 is also located on the outer surface 322 and extends along a lengthwise (axial) direction of the button holder 292. To connect the enter button 290 to the button holder 292, the button 290 is slid over the button holder so that the ribs 332 are received in the slots 312 and the tabs 330 are received in the openings 310. Once assembled, the button holder 292 and a lower portion of the side wall 302 of the enter button 290 are slidingly positioned in the second holder 112. This allows the button holder 292 to be fixed relative to rotation and pivotable with the second holder 112. The second holder 112 can include an engagement member which slidingly receives a part of the button holder (e.g., one of the second strengthening members 342) thereby allowing the button holder to be linearly moveable within the second holder 112.

The slider 294 is located beneath the second holder 112 and button holder 292, and is operably engaged by the linear movement of the button holder 292 to actuate the second input device 124 (FIG. 2). The slider 294 is generally tube shaped and includes a side wall 350. Located on the side wall 350 are spaced apart ribs 352 (only two being shown in FIG. 6). Tabs 354 are positioned generally beneath two of the ribs 352. A foot 356 is provided near a lower end 358 of the slider 294 and is positioned between the pair of tabs 354. An opening 360 is circumferentially spaced from and diametrically opposed to the foot 356. As will be discussed below, depression of the pushbutton moves the foot 356 into contact with the second input device 124 (FIG. 2).

To illuminate the pushbutton 114, a light guide or lens 370 can be mounted in the slider 294. In the depicted embodiment, the light guide 370 includes a tab 372 and a pair of fingers 374 located on a lower portion thereof. To mount the light guide 370 to the slider 294, the light guide is slid in the slider 372 and the tab 372 is positioned in the opening 360. As shown in FIGS. 13-15, a light source, such as an LED 380 can be provided on a printed circuit board 382, which includes a rubber contact 384 having the first and second input devices 122,124. The LED 380 can be located adjacent the second input device 124. The light guide guides the light generated from the LED 380 to the button holder 292. The inner surface 324 of the button holder 292 can be a smooth white surface which further reflects the light to the enter button 290, a portion of which being adapted for illumination. It should be appreciated that alternative manners for illuminating the pushbutton are contemplated.

With reference back to FIGS. 3 and 5, a wheel 400 is connected to the first holder 110. The wheel 400 is rotatable with the first holder 110 and fixed with respect to pivotal movement of the first holder. The wheel 400 is configured to engage the detector 120 as the wheel is rotated with the first holder. Specifically, and according to one aspect, the wheel 400 includes a side wall 402 having an outer surface 404 and an inner surface 406. A first flange 410 extends radially outward from the outer surface 404 and is positioned generally centrally on the side wall 402. A second flange 412 extends radially inward from the inner surface 406 and is positioned near a lower end portion of the side wall 402. A plurality of spaced apart teeth 420 is located circumferentially about the outer surface 404 of the wheel and beneath the first flange 410. The wheel 400 further includes a pair of engagement members 422 for connecting the wheel to the first holder 110. The engagement members 422 extend axially upward from the first flange 410 and include spaced apart fingers 424 and are adapted to allow the wheel 400 to be fixed as the first holder 110 is pivoted. Particularly, and as illustrated in FIG. 14, the length of each finger 424 and the spacing between the fingers allows the flange 132 to move between the fingers as the first holder 110 is pivoted and be engaged by the flange 132 as the first holder 110 rotates. To connect the wheel 400 to the first holder 110, the fingers 424 of the engagement members 422 are positioned in openings 430 provided in the flange 132 of the first holder 110.

Figure 12:
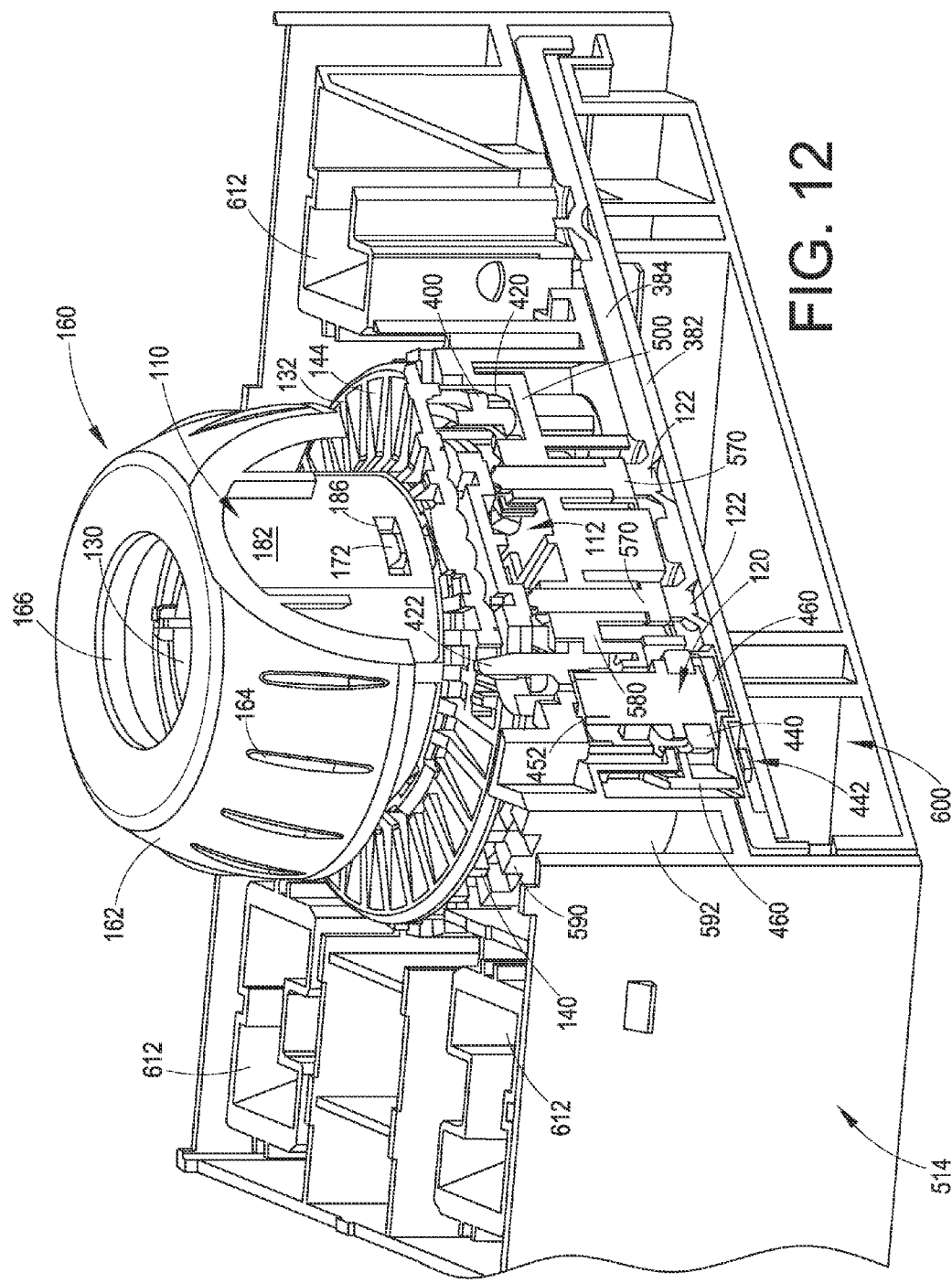
FIGS. 12 and 13 are perspective views, partially broken away, of the multi-position switch assembly of FIG. 1.

As indicated previously, the detector 120 detects the rotational angle or position of the first holder 110. The detector 120 can be an electro-mechanical device used to convert the rotational position of the first holder 110 to a signal which can be communicated to the vehicle control unit (not shown). According to one exemplary aspect, the detector includes a magnet 440 and at least one Hall Effect sensor 442 (FIG. 12) for detecting rotation of the magnet. The magnet 440 is mounted to a lower portion of a body 450. An upper portion of the body 450 includes teeth 452 which correspond to and are engaged by the wheel teeth 420 as the wheel 400 rotates with the first holder 110. Thus, rotation of the wheel 400 rotates of the detector 120. The detector 120 is mounted in a magnet holder 460 which sits atop one of a portion of the housing 102 and the circuit board 382.

Figure 9:
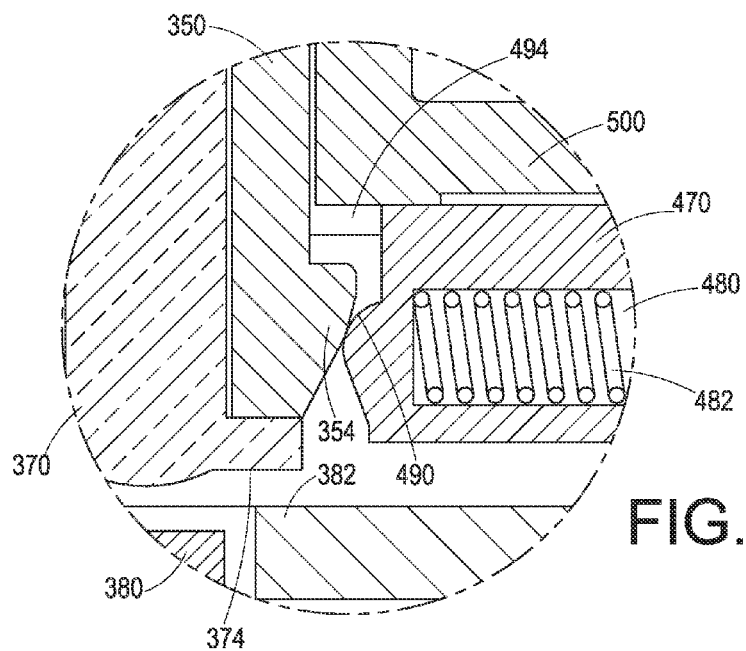
FIGS. 8 and 9 are enlarged cross-sectional views of the pushbutton and second pin in a non-actuated position and an actuated position, respectively.
Figure 8:
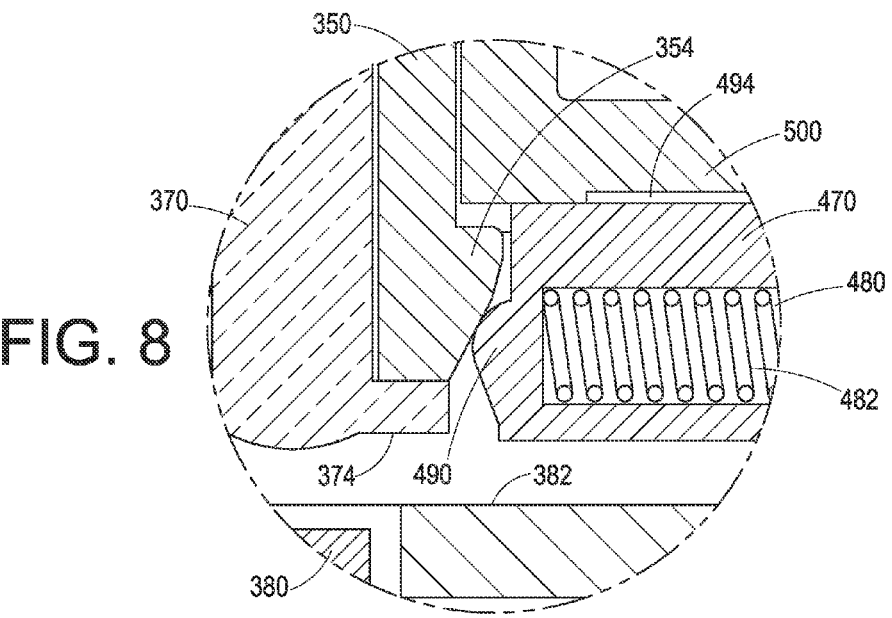
Figure 11:
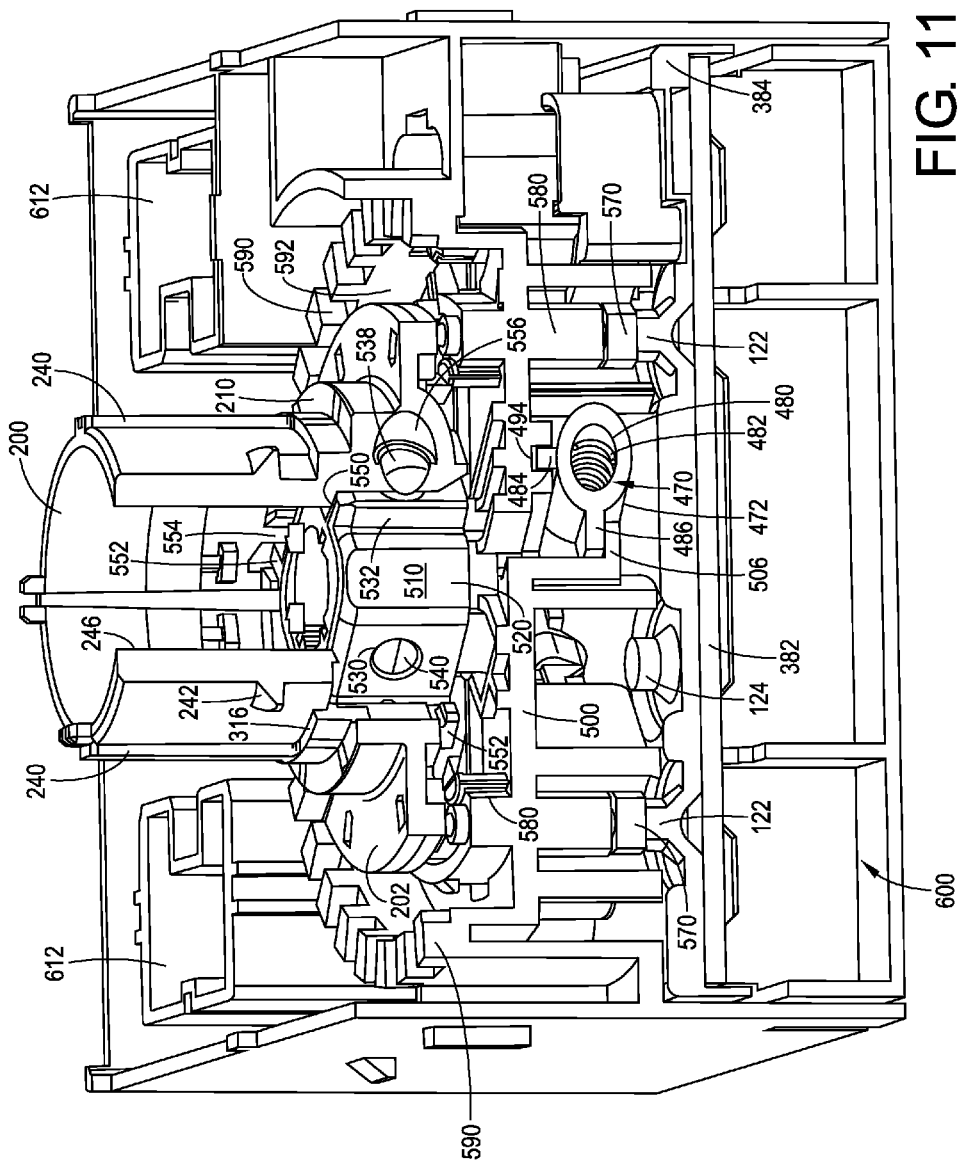
FIG. 11 is an assembled perspective view, partially broken away, of the components shown in FIG. 10.

With reference again to FIGS. 6 and 7, the switch assembly 100 further comprises at least one second pin 470 operatively associated with the pushbutton 114 for urging the pushbutton back to a non-actuated position. Particularly, a pair of opposed second pins 470 are mounted in tracks 472 provided in the housing 102 (FIG. 11). Each second pin 470 includes a body 476 having an elongated opening 480 extending lengthwise at least partially through the body. A spring 482 is located in each opening 480 for biasing each second pin 470 towards the slider 296. A longitudinal rib 484 and a pair of spaced apart tabs 486 are located on each body 476, and a projection 490 is located on a wall 492 of each body 476 which faces the slider 296 in an assembled condition. The rib 484 is slidingly received in a channel 494 located on a first wall 500 of the housing 102. The tabs 486 abut a second wall 506 of the housing 102 positioned beneath the first wall 500 and which at least partially defines the tracks 472. In operation, and as shown in FIGS. 8 and 9, depression of the pushbutton 114 linearly moves the slider 296 into contact with the second input device 124. As the slider moves downwardly, the tabs 354 of the slider 296 engage the projections 490 of the second pins 470. This moves the second pins 470 away from the slider 296 thereby compressing the springs 482, the movement of the second pins also providing tactile feedback to the operator. Once the downward force applied to the pushbutton 114 is removed, the springs 482 move the second pins 470 back toward their initial position, the projections 490 engaging the tabs 354 of the slider 296 and forcing the pushbutton 114 back to its initial position. It should be appreciated that when the downward force to the pushbutton 114 is removed, the pushbutton can be automatically returned to its initial position by a resilient force of a bias mechanism or spring (not shown) of the second input device 124.

FIGS. 10 and 11 depict a joint member 510 for connecting the second holder 112 to the housing 102, the joint member 510 being fixed with respect to rotation of the first holder 110 and pivotable with the second holder 112. In the illustrated embodiment, the joint member 510 is mounted to both the stem 512 provided in the lower portion 514 of the housing 102 and to the second holder 112. The joint member 510 can be generally cylindrically shaped and includes a side wall 520 having an inner surface 522 and an outer surface 524 and an opening 526 extending axially through the joint member. A pair of opposed openings 530 extends through the side wall 520, and a pair of generally U-shaped flanges 532, which extend axially, are located on the side wall 520. Each of the flanges 532 protrudes outwardly from the outer surface 524 and defines a channel 536 which extends axially and is open to the opening 526. Each of the flanges 532 also includes a protruding member 538. The stem 512 includes a pair of outwardly protruding members 540 and a pair of ribs 544.

To mount the joint member 510 on the stem 512, the ribs 544 are positioned in the channels 536 which enable the joint member 510 to slide onto the stem 512. The openings 530 are sized to receive outwardly protruding members 540. Once connected to the stem 512, the joint member 510 is able to pivot about an axis defined by the members 540. The joint member 510 is then connected to the second holder 112. Particularly, the flanges 532 are positioned in the second holder, an upper portion of each flange 532 engaging an inwardly extending ledge 550 located on the inner surface 246 of the second holder 112 near the shelf 210. To ensure proper orientation of the joint member 510 in the second holder, separate ridges 552 are provided on the outer surface 524 of the side wall 520. The ridges 552 are received in corresponding grooves 554 located on the inner surface 246. Once positioned in the second holder 112, the pair of opposed outwardly protruding members 538 provided on the flanges 532 engage cutouts 556 located the second holder 112. The joint member 510 is then able to pivot about an axis defined by the members 538. Therefore, the connection of the joint member 510 to the housing 102 and second holder 112 defines at least two separate, pivotal axes which allow for the pivoting movement of the first holder 110 and the second holder 112. These axes can be perpendicular to each other.

As indicated previously, the slider 294 is located beneath the second holder 112 and includes a side wall 350 having the spaced apart ribs 352. As shown in FIGS. 13-15, the slider 294 is slidingly received in the stem 512. To this end, the stem 512 includes corresponding channels 560 (FIG. 10) sized to receive the ribs 352. To connect the slider to the stem 512 of the housing 102, the slider is inserted into the stem from beneath the lower housing portion 514. The circuit board 382 prevents the slider from falling out of the stem. Prior to placement of the circuit board 382 and rubber contact 384 in the lower housing portion 514, at least one third pin 570 is operatively positioned between the second holder 112 and the first input device 122. The third pin 570 is cylindrically shaped and includes a base 572 located on a lower portion 574 of the third pin. The base 572 limits the displacement of the third pin 570 and also provides a large contact surface for actuating the first input device 122. The third pin 570 is mounted in a boss 580 provided in the lower housing portion 514. As will be explained below, pivotal movement of the second holder 112 engages the third pin 570 which, in turn, actuates the first input device 122.

The first and second input devices 122,124 can be arranged on one of the printed circuit board 382 and the rubber contact 384. As shown, the first and second input devices 122,124 are provided on the rubber contact 384. Each of the first and second input devices can be momentary-contact switches; although, this is not required. In the depicted exemplary embodiment, and as best illustrated in FIG. 2, eight first input devices 122 are circumferentially spaced on the rubber contact 384. The second input device 124 is surrounded by the plurality of first input devices 122 and is positioned adjacent to an axis of rotation of the first holder 110. With this configuration, a plurality of third pins 570 located in a plurality of bosses 580 are provided, one third pin 570 for each first input device 122 (FIG. 11). Thus, the pivoting or tilting of the second holder 112 actuates one of the first input devices 122 to control a plurality of kinds of functions associated with the display screen. For example, actuation of the first input device 122 can actuate side-side/up-down/diagonal movement of an on-screen cursor of the display screen. The pushbutton 114 is then used as a select or enter switch for selecting a function/option displayed on the display screen. It should be appreciated that when the pivoting force to the second holder 112 is removed, second holder can be automatically returned to its original position by a resilient force of a bias mechanism or spring (not shown) of the first input device 122.

As indicated previously, the first holder 110 includes the flange 132 having the plurality of spaced apart projections 140. With reference to FIGS. 14 and 15, the housing 102 is configured to engage the first holder 110 to prevent rotation of the first holder as the second holder 112 is pivoted with the first holder 110 to actuate the first input device 122. To prevent rotation of the first holder 110 in a pivoted position, the housing 102 includes a plurality of spaced apart engagement members or projections 590. As shown, the projections 590 can correspond in number and shape to the projections 140; although, this is not required. As shown, and similar to the projections 140, the projections 590 are rectangular shaped. In the depicted embodiment, the projections 590 are located on an upper surface of a wall 592 which extends substantially perpendicularly from the first wall 500 of the lower housing portion 514. The wall 592 can have a shape corresponding to the shape of the flange 132 and, in the illustrated embodiment, is circular shaped; although, this is not required.

In operation, and as depicted in FIGS. 14 and 15, pivoting of the gripping member 160 to, for example, move an on-screen cursor of the display screen, pivots the first holder 110. As indicated above, the second holder 112 pivots with the first holder to actuate the first input device 122. In the pivoted position, the projections 140 of the first holder 110 engage the projections 590 of the housing 102. This meshing of the projections 140,590 prevents simultaneous rotation of the first holder 110 as the second holder 112 actuates the first input device 122. This, in turn, can prevent misoperation of the switch assembly 100. For example, if the display screen is a vehicle navigation system, rotation of the first holder 110 can enlarge or reduce a displayed map. The second holder 112 can be pivoted in a direction towards which the map is to be moved. Because the first holder 110 is fixed with respect to rotation via engagement of the projections 140,590, the wheel 400 and detector 120 are also fixed with respect to rotation. Therefore, a function of the display screen associated with rotation of the first holder 110 (i.e. changing a size of a displayed map) is prevented as the operator is actuating a function associated with pivoting of the second holder 112 (i.e., moving a displayed map).

As indicated previously, and according to one aspect, the projections 140,590 are rectangular shaped. With this configuration of the projections 140,590, rotation of the first holder 110 is completely prevented, but there can be some knob holder backlash as an operator tries to rotate the first holder 110 in the pivoted position. However, it should be appreciated that alternative shapes for the projections 140, 590 are contemplated. For example, and as shown in FIGS. 16-19, the projections 140,590 can be one of trapezoidal shaped and triangular shaped. This configuration of the projections allows slight rotation between the projections 140 of the first holder 110 and the projections 590 of the lower housing portion 514 in the pivoted position of the first holder. This reduces knob holder backlash as the operator tries to rotate the knob holder 110 in the pivoted position. However, the trapezoidal or triangular shaped projections 140,590 prevent rotation of the first holder 110 in the pivoted position which would also cause rotation of the wheel 400 and the detector 120. It should be appreciated that with the alternative configurations of the projections 140,590 depicted in FIGS. 16-19, the first holder 110 can rotate after a predetermined rotational force is exceeded, which will prevent damage to the switch assembly 100.

The assembly of the multi-position switch assembly 100 according to one aspect of the present disclosure will now be described. To assemble the switch assembly 100, the springs 482 are placed in the openings 480 of the second pins 470 and the second pins 470 are slid into the lower housing portion 514. The light guide 370 is fitted into the slider 294. The slider 294 is positioned in the stem 512 (from a bottom of the lower housing portion 514) and the third pins 570 are positioned in the bosses 580. The body 450 for the magnet 440 is located in the lower housing portion 514. The magnet holder 460 is then connected to the lower housing portion 514 which secures the body 450. The rubber contact 384 and circuit board 382 are placed in the lower housing portion 514 beneath the slider 294 and the third pins 570 such that the first input devices 122 are aligned with the third pins 570 and the second input device 124 is aligned with the foot 356 of the slider 294. The circuit board 382 and rubber contact 384 are then secured to the lower housing 514 via a housing bottom 600. The housing bottom 600 is connected to the lower portion 514 via fasteners 602, which extend through bosses 604 provided in the housing bottom 600 and engage second bosses 610 provided in the lower portion 514 (FIGS. 13 and 15).

The joint member 510 is then connected to the stem 512 and the second holder 112 is connected to the joint member. The pushbutton 114 is then assembled as described above and is positioned in the second holder 112, and the ring member 220 is connected to the second holder 112. Particularly, the button holder 292 is assembled through the lower portion of the second holder 112 and the second holder 112 is connected to the joint member 510. The springs 154 are set inside the cutouts 280 and the first pins 152 are positioned on top of the springs 154. The wheel 400 is positioned in the lower housing portion 514 so that the teeth 420 engage the teeth 452 of the detector 120. The first holder 110 is then connected to the wheel 400. The ring member 220 is assembled to the second holder 112 and this prevents the first holder 110 from being disassembled. Function buttons 610 for the display screen are slidingly connected to third bosses 612 located in the lower housing portion 514. Depression of the each function button 610 actuates a third input device 620 provided on the circuit board 382. The enter button 290 is connected to the button holder 292. An upper housing portion 630 is then connected to the lower housing portion 514. The upper housing portion 630 includes a central opening 632 through which the first holder 110 at least partially projects and openings 634 for the buttons 610. Finally, the gripping member 160 is connected to the first holder 110. It should be appreciated that the above described assembly method is by way of example only and that alternative assembly methods for the switch assembly 100 are contemplated.

In view of the foregoing, a method of assembling the multi-function switch assembly 100 for controlling a vehicle display screen is provided. The method comprises providing a housing 102 including a plurality of engagement members 590; positioning a first knob holder 110 within the housing 102 so that the first holder rotates and pivots with respect to the housing, the first knob holder 110 having a plurality of engagement members 140; aligning the engagement members 140,590 such that in a pivoted position of the first holder 110 the engagement members 140,590 engage each other to prevent rotation of the first holder 110 while in the pivoted position; positioning a second holder 112 within the housing 102 and at least partially in the first holder 110 so that the second holder 112 is pivotable with the first holder 110 and is fixed with respect to rotation of the first holder; supporting the first holder 110 in the housing 102 with the second holder 112; connecting a joint member 510 to both the housing 102 and the second holder 112 to define at least two pivotal axes which allow for pivoting movement of the first and second holders; positioning a pushbutton 114 through the first holder 110 and the second holder 112 such that the pushbutton is fixed against rotation with respect to the housing 102 and is movable linearly relative to the second holder 112; locating a detector 120 within the housing 102 to detect rotation of the first holder 110; locating a plurality of first momentary-contact switches 122 within the housing 102 such that each first momentary-contact switch 122 is actuated by pivoting movement of the second holder 112; and locating a second momentary-contact switch 124 within the housing 102 such that the second momentary-contact switch 124 is actuated by linear movement of the pushbutton 114.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A multi-position switch assembly for controlling a vehicle display screen comprising:
   a housing;
   a first holder configured for both rotational and pivotal movement with respect to the housing;
   a second holder at least partially received in the first holder, the second holder being rotationally fixed with respect to the housing and being pivotable with the first holder, wherein the second holder at least partially supports the first holder but is not directly connected to the first holder;
   a pushbutton extending through and supported by the second holder, the pushbutton being fixed against rotation with respect to the housing and being movable linearly relative to the second holder;
   a detector adapted to detect a rotation angle of the first holder;
   a first input device actuated by pivotal movement of the second holder, wherein the first holder is spaced from the first input device such that rotational and pivotal movement of the first holder does not contact the first input device; and
   a second input device actuated by linear movement of the pushbutton.

2. The multi-position switch assembly of claim 1, wherein the first holder and second holder are positioned in the housing, the housing being configured to engage the first holder to prevent rotation of the first holder as the second holder is pivoted to actuate the first input device.

3. The multi-position switch assembly of claim 2, wherein the first holder includes spaced apart projections and the housing includes corresponding spaced apart projections, the projections of the first holder engaging the projections of the housing.

4. The multi-position switch assembly of claim 3, wherein the first holder includes a generally cylindrical part and a flange extending radially from an end portion of the generally cylindrical part, the projections being positioned on the radial flange.

5. The multi-position switch of claim 4, wherein the second holder includes at least one first pin biased toward the radial flange, the radial flange further including a plurality of spaced apart indicators located inwardly from the projections, the at least one first pin engaging the indicators as the first holder is rotated thereby providing feedback to the operator of rotation of the first holder.

6. The multi-position switch of claim 2, further including a joint member, the joint member being mounted to both the housing and the second holder, the joint member having a pair of opposed openings sized to receive outwardly protruding members provided on the housing and a pair of opposed outwardly protruding members for engaging the second holder, the joint member being fixed with respect to rotation and pivotable with the second holder.

7. The multi-position switch of claim 1, further including a wheel connected to the first holder, the wheel being rotatable with the first holder and fixed with respect to pivotal movement of the first holder.

8. The multi-position switch of claim 7, wherein the wheel includes a pair of engagement members for connecting the wheel to the first holder, the engagement members adapted to allow the wheel to be fixed as the first holder is pivoted.

9. The multi-position switch assembly of claim 1, wherein the second holder includes a generally cylindrical part and a flange extending radially from an end portion of the generally cylindrical part for actuating the first input device.

10. The multi-position switch assembly of claim 1, wherein the pushbutton includes an enter knob, a knob holder and a slider, the enter knob being connected to the knob holder, the knob holder being slidably received in the second holder, the knob holder being fixed relative to rotation and pivotable with the second holder, and the slider being positioned beneath the knob holder and adapted to activate the second input device.

11. The multi-position switch assembly of claim 1, further including a ring member and an annular gripping member for ease of handling of the switch assembly by an operator, the second holder being at least partially received in the ring member and engaged thereto, the ring member being fixed relative to rotation and pivotable with the second holder, the first holder being engaged to the annular gripping member.

12. The multi-position switch assembly of claim 1, further including at least one second pin and at least one third pin, the second pin being operatively associated with the pushbutton for urging the pushbutton back to a non-actuated position, and the third pin being operatively positioned between the second holder and the first input device, wherein pivotal movement of the second holder engages the third pin which, in turn, actuates the first input device.

13. A multi-position switch assembly for controlling a vehicle display screen comprising:
a housing;
a first knob holder positioned within the housing and configured to rotate and pivot with respect to the housing, wherein in a pivoted position the first knob holder is configured to engage the housing to prevent rotation of the first knob holder while in the pivoted position;
a second holder positioned within the housing and at least partially received in the first knob holder, the second holder being fixed with respect to rotation of the first knob holder and being pivotable with the first knob holder, the second holder at least partially supports the first knob holder within the housing;
a pushbutton extending through the first knob holder and the second holder, the pushbutton being supported by the second holder, the pushbutton being fixed against rotation with respect to the housing and being movable linearly relative to the second holder;
a detector adapted to detect rotation of the first knob holder;
a plurality of first momentary-contact switches positioned within the housing, each first momentary-contact switch being actuated by pivoting movement of the second holder; and
a second momentary-contact switch positioned within the housing and actuated by linear movement of the pushbutton.

14. The multi-position switch assembly of claim 13, wherein the first knob holder is spaced from the first momentary-contact switches by the second holder such that the first momentary-contact switches are not contacted by rotational and pivotable movement of the first knob holder.

15. The multi-position switch assembly of claim 13, wherein the first knob holder includes a flange having spaced apart projections and the housing includes a wall having corresponding spaced apart projections, the projections of the first knob holder engaging the projections of the housing as the second holder is pivoted to actuate one of the first momentary-contact switches.

16. The multi-position switch assembly of claim 13, further including a wheel connected to the first knob holder, the wheel being rotatable with the first holder and fixed with respect to pivotal movement of the first holder.

17. The multi-position switch assembly of claim 13, further including a joint member operably connected to both the housing and the second holder, the connection of the joint member defining at least two pivotal axes which allow for the pivoting movement of the first knob holder and second holder.

18. A multi-position switch assembly for controlling a vehicle display screen comprising:
a housing having a plurality of first engagement members;
a first knob holder positioned within the housing and configured to rotate and pivot with respect to the housing, the first knob holder having a plurality of second engagement members, wherein in a pivoted position the first engagement members engage the second engagement members to prevent rotation of the first knob holder while in the pivoted position;
a second holder positioned within the housing and at least partially received in the first knob holder, the second holder being fixed with respect to rotation of the first knob holder and being pivotable with the first knob holder, the second holder at least partially supports the first knob holder within the housing but is not directly connected to the first knob holder;
a joint member operably connected to both the housing and the second holder, the connection of the joint member defining at least two pivotal axes which allow for the pivoting movement of the first knob holder and second holder;
a pushbutton extending through the first knob holder and the second holder, the pushbutton being fixed against rotation with respect to the housing and being movable linearly relative to the second holder;
a detector adapted to detect rotation of the first knob holder;
a plurality of first momentary-contact switches positioned within the housing, each first momentary-contact switch being actuated by pivoting movement of the second holder, the first knob holder being spaced from the first momentary-contact switches as the first knob holder rotates within the housing; and
a second momentary-contact switch positioned within the housing and actuated by linear movement of the pushbutton.

19. The multi-position switch assembly of claim 18, further including a wheel connected to the first knob holder, the wheel being rotatable with the first holder and fixed with respect to pivotal movement of the first holder.

20. A method of assembling a multi-function switch assembly for controlling a vehicle display screen comprising:
providing a housing including a plurality of first engagement members;
positioning a first knob holder within the housing so that the first holder rotates and pivots with respect to the housing, the first knob holder having a plurality of second engagement members;
aligning the first and second engagement members such that in a pivoted position of the first knob holder the first and second engagement members engage each other to prevent rotation of the first knob holder while in the pivoted position;
positioning a second holder within the housing and at least partially in the first knob holder so that the second holder is pivotable with the first knob holder and is fixed with respect to rotation of the first knob holder;
supporting the first knob holder in the housing with the second holder;
connecting a joint member to both the housing and the second holder to define at least two pivotal axes which allow for pivoting movement of the first knob holder and second holder;
positioning a pushbutton through the first knob holder and the second holder such that the pushbutton is fixed against rotation with respect to the housing and is movable linearly relative to the second holder;
locating a detector within the housing to detect rotation of the first knob holder;
locating a plurality of first momentary-contact switches within the housing such that each first momentary-contact switch is actuated by pivoting movement of the second holder; and
locating a second momentary-contact switch within the housing such that the second momentary-contact switch is actuated by linear movement of the pushbutton.

* * * * *